US009201865B2

(12) United States Patent
Tran

(10) Patent No.: US 9,201,865 B2
(45) Date of Patent: Dec. 1, 2015

(54) AUTOMATED ASSISTANCE FOR USER REQUEST THAT DETERMINES SEMANTICS BY DOMAIN, TASK, AND PARAMETER

(71) Applicant: Bao Tran, Saratoga, CA (US)

(72) Inventor: Bao Tran, Saratoga, CA (US)

( * ) Notice: Subject to any disclaimer, the term of this patent is extended or adjusted under 35 U.S.C. 154(b) by 273 days.

(21) Appl. No.: 13/841,217

(22) Filed: Mar. 15, 2013

(65) Prior Publication Data
US 2014/0278343 A1 Sep. 18, 2014

(51) Int. Cl.
*G10L 15/22* (2006.01)
*G06F 17/27* (2006.01)
*G06F 17/28* (2006.01)
*G06Q 10/10* (2012.01)

(52) U.S. Cl.
CPC .......... *G06F 17/2785* (2013.01); *G06F 17/289* (2013.01); *G06Q 10/109* (2013.01)

(58) Field of Classification Search
CPC ..... G10L 15/18; G10L 15/1815; G10L 15/22; G10L 2015/221; G10L 2015/223; G06F 17/2785; G06F 17/28; G06F 17/289; G06Q 10/109
USPC .............. 704/2, 3, 8, 9, 255, 257, 270.1, 275, 704/277, 7
See application file for complete search history.

(56) References Cited

U.S. PATENT DOCUMENTS

| 5,933,822 | A * | 8/1999 | Braden-Harder et al. | |
|---|---|---|---|---|
| 6,233,561 | B1 * | 5/2001 | Junqua et al. | 704/257 |
| 6,246,981 | B1 * | 6/2001 | Papineni et al. | 704/235 |
| 6,757,718 | B1 * | 6/2004 | Halverson et al. | 704/257 |
| 6,952,665 | B1 * | 10/2005 | Shimomura et al. | 704/2 |
| 7,103,553 | B2 * | 9/2006 | Applebaum et al. | 704/275 |
| 8,315,360 | B2 * | 11/2012 | Bushey et al. | 704/270 |
| 8,515,749 | B2 * | 8/2013 | Stallard | 704/235 |
| 8,849,659 | B2 * | 9/2014 | Tran | G06Q 30/0209 463/39 |
| 9,130,900 | B2 * | 9/2015 | Tran | H04L 67/02 |
| 2010/0185700 | A1 * | 7/2010 | Bodain | G06F 17/30734 707/803 |
| 2011/0035452 | A1 * | 2/2011 | Gittleman | 709/206 |
| 2011/0166860 | A1 * | 7/2011 | Tran | G06Q 30/0209 704/254 |
| 2012/0077178 | A1 * | 3/2012 | Bagchi | G09B 7/00 434/362 |
| 2012/0143570 | A1 * | 6/2012 | Austin | G06Q 10/00 703/1 |
| 2012/0209589 | A1 * | 8/2012 | Baek et al. | 704/3 |
| 2012/0271640 | A1 * | 10/2012 | Basir | 704/275 |
| 2013/0110519 | A1 * | 5/2013 | Cheyer et al. | 704/275 |
| 2013/0211710 | A1 * | 8/2013 | Kennewick et al. | 704/275 |
| 2013/0317994 | A1 * | 11/2013 | Tran | G06Q 10/10 705/310 |
| 2013/0332172 | A1 * | 12/2013 | Prakash et al. | 704/270.1 |
| 2014/0229421 | A1 * | 8/2014 | Thomas | G06N 99/005 706/59 |
| 2014/0280757 | A1 * | 9/2014 | Tran | H04L 67/02 709/219 |

* cited by examiner

*Primary Examiner* — Martin Lerner
(74) *Attorney, Agent, or Firm* — Tran & Associates

(57) ABSTRACT

Systems and methods are disclosed for providing automated assistance for a user by receiving a user request for assistance and determining semantics of the user request and identifying at least one domain, at least one task, and at least one parameter for the user request. The systems and methods can include searching a semantic database on the Internet for the at least one matching domain, task, and parameter and responding to the user request.

20 Claims, 11 Drawing Sheets

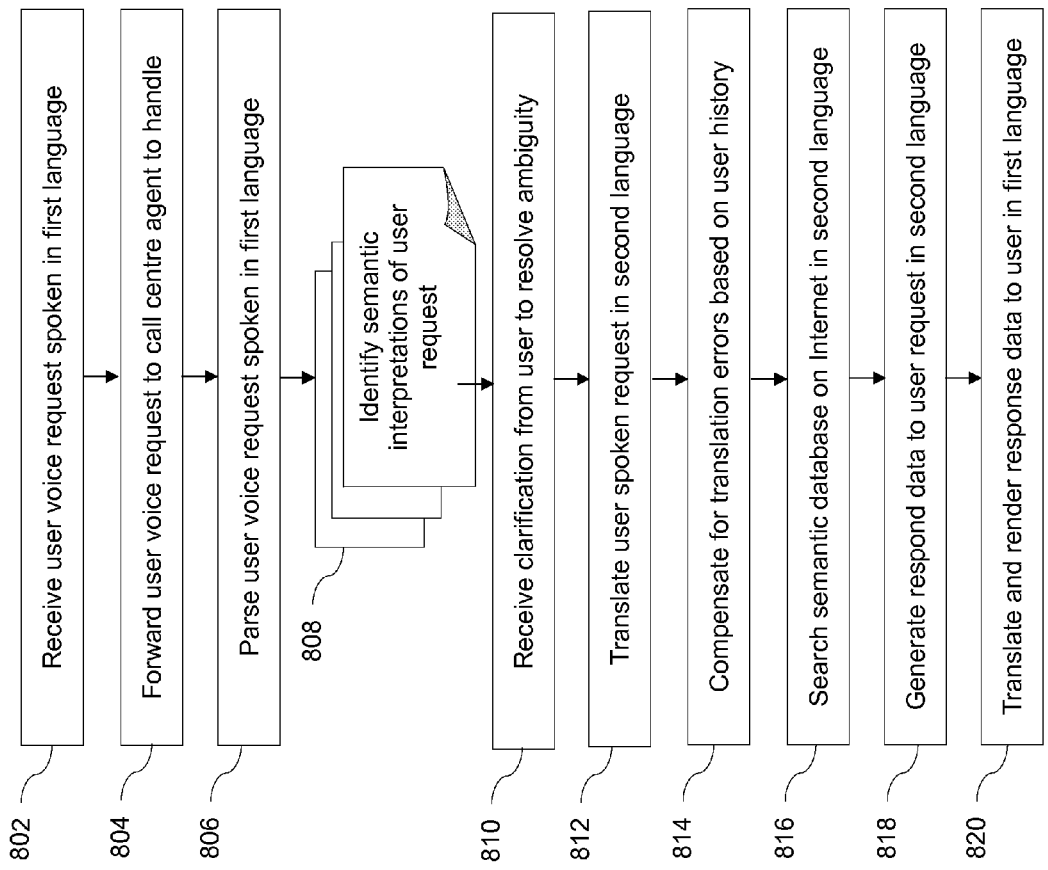

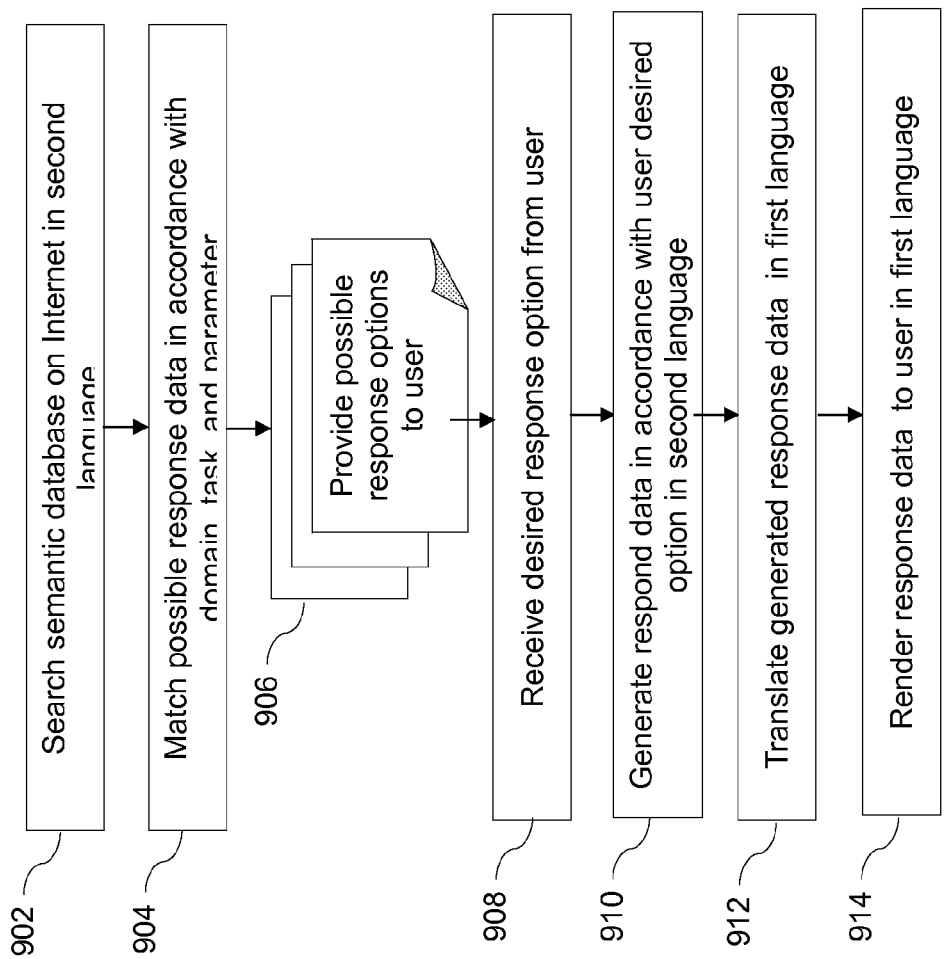

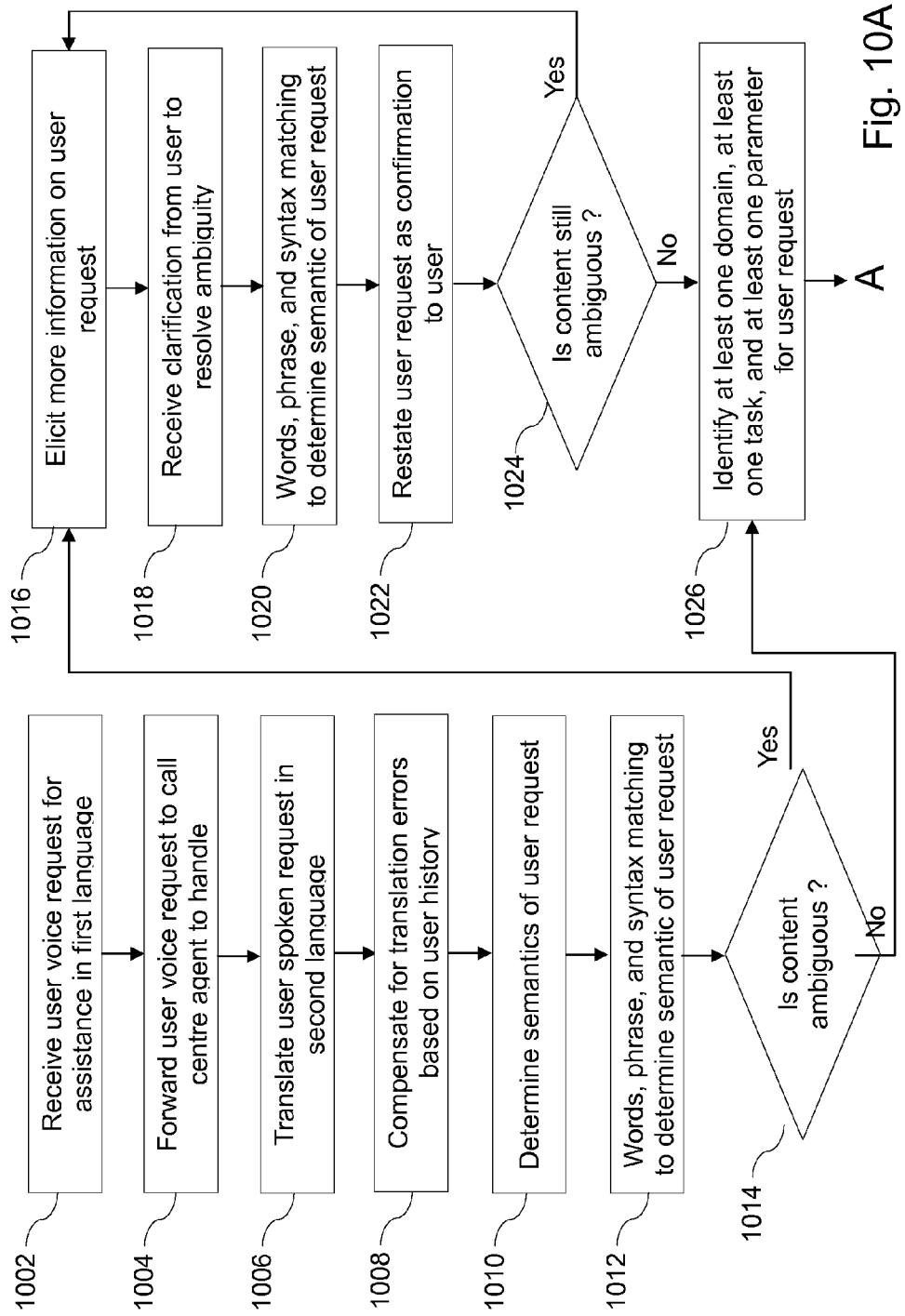

AUTOMATED ASSISTANCE FOR USER REQUEST THAT DETERMINES SEMANTICS BY DOMAIN, TASK, AND PARAMETER

BACKGROUND

Personal productivity software has helped to streamline and simplify the role of information workers. Beginning with basic email clients, productivity software has grown to include a variety of other "desktop" applications, replacing paper calendars, rolodexes, and task lists with their software equivalents. Hybrid programs sometimes referred to as personal information managers (PIMs) have succeeded somewhat in combining these disparate programs into a single interface. Not only are such applications able to track appointments, to do's, contacts, and so forth, but they can combine the functions, such that setting up a meeting merely requires adding an appointment to your calendar and adding contacts to the appointment. Some applications have taken personal information managers a step further, enabling new interface methods, such as having a user's email read to her by phone.

Having all this relevant information available in one place may have enhanced user productivity, but these PIMs have failed to take full advantage of the information. For example, when a user creates a new appointment, she must still discern how long of a lead time will be needed for a reminder, or provide one default value that is used for all reminders. Furthermore, if the user is not at her desk when the reminder is triggered, then she may forget the appointment, and the reminder is wasted. Ultimately, PIMs and their users do not take full advantage of the information available to them to further enhance productivity.

United States Patent Application 20070043687 discloses methods for assisting a user with a variety of tasks. A virtual assistant has access to a user's contacts, calendar, and location. The virtual assistant also is able to access information about weather, traffic, and mass transit, and is able to adjust the time for alerting a user about an upcoming appointment. The virtual assistant also has a rules engine enabling a user to create rules for handling incoming calls and instant messages, rerouting calls based on their caller identification. The virtual assistant also has a query engine enabling a user to find a document and to work with it, including sending it to a contact in the user's address book. Interfaces to virtual assistant may include installed software client, web browser, SMS/instant message, as well as an interactive voice response system.

One recent interaction paradigm is the Virtual Personal Assistant (VPA). Siri is a virtual personal assistant for the mobile Internet. Although just in its infancy, Siri can help with some common tasks that human assistants do, such as booking a restaurant, getting tickets to a show, and inviting a friend.

SUMMARY

Systems and methods are disclosed for providing automated assistance for a user by receiving a user request for assistance and determining semantics of the user request and identifying at least one domain, at least one task, and at least one parameter for the user request. The systems and methods can include searching a semantic database on the Internet for the at least one matching domain, task, and parameter and responding to the user request. receiving a user request for assistance; determining semantics of the user request and identifying at least one domain, at least one task, and at least one parameter for the user request; searching a semantic database on the Internet for the at least one matching domain, task, and parameter; and responding to the user request.

Implementations of the system may include one or more of the following. The method includes managing emails by filtering important emails and responding to the rest on the user's behalf, wherein a user provides guidance on how to pick out key emails and a virtual assistant copies the user before sending out any responses to reduce the risk of errors. The method includes performing social chores for the user including writing notes on behalf of the user. The method includes performing travel research including finding hotels, booking airfares and mapping out trip itineraries. The method includes managing a calendar for the user, dealing with meeting invitations from others, scheduling appointments with clients and helping to plan events. Advantages of the preferred embodiments may include one or more of the following. The system is task focused: it helps you get things done. You interact with it in natural language, in a conversation. It gets to know you, acts on your behalf, and gets better with time. The VPA paradigm builds on the information and services of the web, with new technical challenges of semantic intent understanding, context awareness, service delegation, and mass personalization. The system helps user offload time consuming and tedious tasks, leaving time to pursue more important things.

BRIEF DESCRIPTION OF DRAWINGS

FIG. 8 depicts a diagram, by way of example, but not by way of limitation, a method for handling user request for assistance, according to an embodiment of the present invention;

FIG. 9 depicts a diagram, by way of example, but not by way of limitation, a method for providing response to the user, according to an embodiment of the present invention; and FIGS. 10A and 10B depicts a diagram, by way of example, but not by way of limitation, a method for providing user personalized response in accordance with the request received from the user for assistance, according to an embodiment of the present invention.

DETAILED DESCRIPTION

Figure 1:
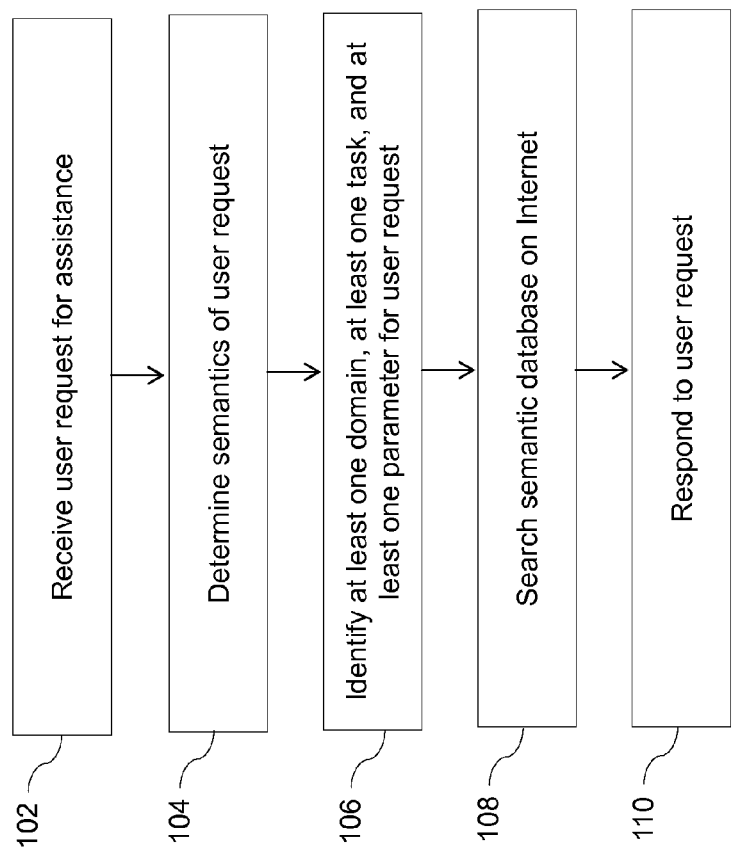
FIG. 1 depicts a diagram, by way of example, but not by way of limitation, a method for providing automated assistance for a user, in accordance with various embodiments of the present invention.

In the following detailed description, reference is made to the accompanying drawings which form a part hereof, and in which is shown by way of illustration specific embodiments in which the invention may be practiced. These embodiments, which are also referred to herein as "examples," are described in sufficient detail to enable those skilled in the art to practice the invention, and it is to be understood that the embodiments may be combined, or that other embodiments may be utilized and that structural, logical, and electrical changes may be made without departing from the scope of the present invention. The following detailed description is, therefore, not to be taken in a limiting sense, and the scope of the present invention is defined by the appended claims and their equivalents. In this document, the terms "a" or "an" are used, as is common in patent documents, to include one or more than one. In this document, the term "or" is used to refer to a "nonexclusive or" unless otherwise indicated.

Various techniques will now be described in detail with reference to a few example embodiments thereof as illustrated in the accompanying drawings. In the following description, numerous specific details are set forth in order to provide a thorough understanding of one or more aspects or features described or referenced herein. It will be apparent, however, to one skilled in the art, that one or more aspects or features described or referenced herein may be practiced without some or all of these specific details. In other instances, well known process steps or structures have not been described in detail in order to not obscure some of the aspects or features described or referenced herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations.

Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality or the features of a device may be alternatively embodied by one or more other devices that are not explicitly described as having such functionality/features. Thus, other embodiments of one or more of the invention(s) need not include the device itself.

Techniques and mechanisms described or referenced herein will sometimes be described in singular form for clarity. However, it should be noted that particular embodiments include multiple iterations of a technique or multiple instantiations of a mechanism unless noted otherwise.

Although described within the context of intelligent automated assistance technology, it may be understood that the various aspects and techniques described herein may also be deployed or applied in other fields of technology involving human or computerized interaction with software.

Generally, the intelligent automated assistance techniques disclosed herein may be implemented on hardware or a combination of thereof. For example, they may be implemented in an operating system kernel, in a separate user process, in a library package bound into network applications, on a specially constructed machine, or on a network interface card. In a specific embodiment, the techniques disclosed herein may be implemented in software such as an operating system or in an application running on an operating system.

Software or hardware hybrid implementation of at least some of the intelligent automated assistance embodiment(s) disclosed herein may be implemented on a programmable machine selectively activated or reconfigured by a computer program stored in memory. Such network devices may have multiple network interfaces which may be configured or designed to utilize different types of network communication protocols. A general architecture for some of these machines may appear from the descriptions disclosed herein. According to specific embodiments, at least some of the features or functionalities of the various intelligent automated assistance embodiments disclosed herein may be implemented on one or more general-purpose network host machines such as an end-user computer system, computer, network server or server system, mobile computing device (e.g., personal digital assistant, mobile phone, smart phone, laptop, tablet computer, or the like), consumer electronic device, music player, or any other suitable electronic device, router, switch, or the like, or any combination thereof. In at least some embodiments, at least some of the features or functionalities of the various intelligent automated assistance embodiments disclosed herein may be implemented in one or more virtualized computing environments (e.g., network computing clouds, or the like).

FIG. 1 depicts a diagram, by way of example, but not by way of limitation, a method 100 for providing automated assistance for a user in accordance with various embodiments of the present invention. At 102, the method 100 may allow a computing device to provide assistance to the user. The computing device described herein may be configured to be capable of implementing at least a portion of the intelligent automated assistance features or functionalities disclosed herein. The computing device described herein may include, for example, but not limited to, a telephone, a wireless communicator, a tablet computer, a laptop computer, a personal digital assistant, a desktop computer, a processor with memory, a kiosk, a consumer electronic device, a consumer entertainment device, a music player, a camera, a television, an electronic gaming unit, or any combination thereof. The computing device may be configured to communicate with other devices, such as clients or servers, over a communications network. The communication network described herein may include one or more wireless communications network or one or more wire line communications network. The wireless communications network may include for example, but not limited to, a digital cellular network, such as Global System for Mobile Telecommunications (GSM) network, Personal Communication System (PCS) network, or any other wireless communications network. The wire line communications network may include for example, but not limited to, the Public Switched Telephone Network (PSTN), proprietary local and long distance communications network, or any other wire line communications network. One or more networks may be included in the communication network and may include both public networks such as the Internet, and private networks and may utilize any networking technology and protocol, such as Ethernet, Token Ring, Transmission Control Protocol/Internet Protocol (TCP/IP), or the like to allow interaction among the various devices.

In an embodiment, the computing device may be configured to include a central processing unit (CPU), interfaces, or a bus. The CPU described herein may be configured for implementing specific functions associated with the functions of a specifically configured computing device or machine. For example, in one or more embodiments, a user's personal digital assistant (PDA) may be configured or designed to function as an intelligent automated assistance system utilizing CPU, memory, or interfaces configure thereon. In one or more embodiments, the CPU may be configured to perform one or more of the different types of intelligent automated assistance functions or operations under the control of software modules or components, which for example, may include an operating system or any appropriate applications software, drivers, or the like.

At 102, the method 100 may allow the computing device to receive a request for assistance from the user. The user may provide the request to the computing device via a voice input. In an embodiment, the user may provide the voice input request such as "I have a meeting on $9^{th}$ September 2012" to the computing device. In an embodiment, the request may be forwarded to a call centre agent for handling. At 104, the method 100 may allow the computing device to determine semantics of the user request and identify at least one domain, at least one task, and at least one parameter for the user request. In an embodiment, the term semantic described herein may refer to signifiers or linguistics of the first language, such as used by the computing device in communication with the one or more servers, to identify expressions, words, phrases, signs or symbols, through the first language. The computing device may be configured to determine the semantics of the user request, using the techniques described herein, and may call external services to interface with a calendar function or application on the computing device. In an embodiment, the act of determining the semantics of the user voice request may include producing sorted indices for the semantic data, such as identified from the user voice data request.

At 108, the computing device may search a semantic database on the Internet for the at least one matching domain, task, and parameter. One embodiment works with the Web Ontology Language (OWL), a W3C Recommendation and a Semantic Web building block. OWL supports the kind of machine interpretability described above. The language is built on formalisms that admit to Description Logic (DL) forms and therefore allows reasoning and inference. Reasoning is the act of making implicit knowledge explicit. For example, an OWL knowledge base containing descriptions of students and their parents could infer that two students exhibited the 'brother' relationship if there were both male and shared one or more parent. No explicit markup indicating the 'brotherhood' relationship need ever have been declared. A Reasoning Engine is computational machinery that uses facts found in the knowledge base and rules known a priori to determine Subsumption, Classification, Equivalence, and so on. F-OWL, FaCT, and Racer are examples of such engines. OWL Full is so expressive that there are no computational guarantees that inferences can be made effectively and it is unlikely that any such engine will be able to support all its features soon. However, OWL Lite and subsets of OWL DL can be supported.

In an embodiment, the semantic database described herein may be a triple store database, such as operating one or more database management programmes to manage a triple store. In an embodiment, the term 'triple' described herein may refer to various elements of the user voice data request and their interrelationship as either "Subject", "Verb", or "Object". In an embodiment, the term 'triple' described herein may refer to the use of the semantic data, such as identified from the user voice request. In an embodiment, the one or more database management programmes may be configured to collate selected triples, within the store, into the triple store database, such as when the selected sets of triples is accessed in the course of executing a query on the store.

At 110, the method 100 may allow the computing device to respond to the user in accordance with the at least one matching domain, task, and parameter. In an embodiment, the computing device can be configured to provide assistance to the user in accordance with the request received from the user. The computing device may be configured, designed, or operable to provide various different types of operations, functionalities, services, or features. The computing device may be configured to automate the application of data and services, such as for example, but not limited to, purchase, reserve, or order products and services, available over the Internet. Consequently, the computing device may be configured to automate the process of using these data and services. The computing device may be further configured to enable the combined use of several sources of data and services. For example, the computing device may combine information about products from several sites, check prices and availability from multiple distributors, and check their locations and time constraints, and provide the user with personalized response for the requests.

The computing device may be configured to automate the use of data and services available over the Internet to find, investigate, suggest, or recommend the user about the things to do, such as, for example, but not limited to, movies, events, performances, exhibits, shows, attractions, or the like. In an embodiment, the computing device may be configured to automate the use of data and services available on the internet to find, investigate, suggest, or recommend places to go, such as for example, but not limited to, travel destinations, hotels, restaurants, bars, pubs, entertainment sites, landmarks, summer camps, resorts, or other places.

The computing device may be configured to enable the operation of applications and services via natural language processing techniques that may be otherwise provided by dedicated applications with graphical user interfaces including search, such as for example, but not limited to, location-based search, navigation such as maps and directions, database lookup such as finding businesses or people by name or other parameters, getting weather conditions and forecasts, checking the price of market items or status of financial transactions, monitoring traffic or the status of flights, accessing and updating calendars and schedules, managing reminders, alerts, tasks and projects, communicating over email or other messaging platforms, or operating devices locally or remotely. In an embodiment, the computing device may be configured to initiate, operate, or control many functions or apps available on the device.

Figure 2:
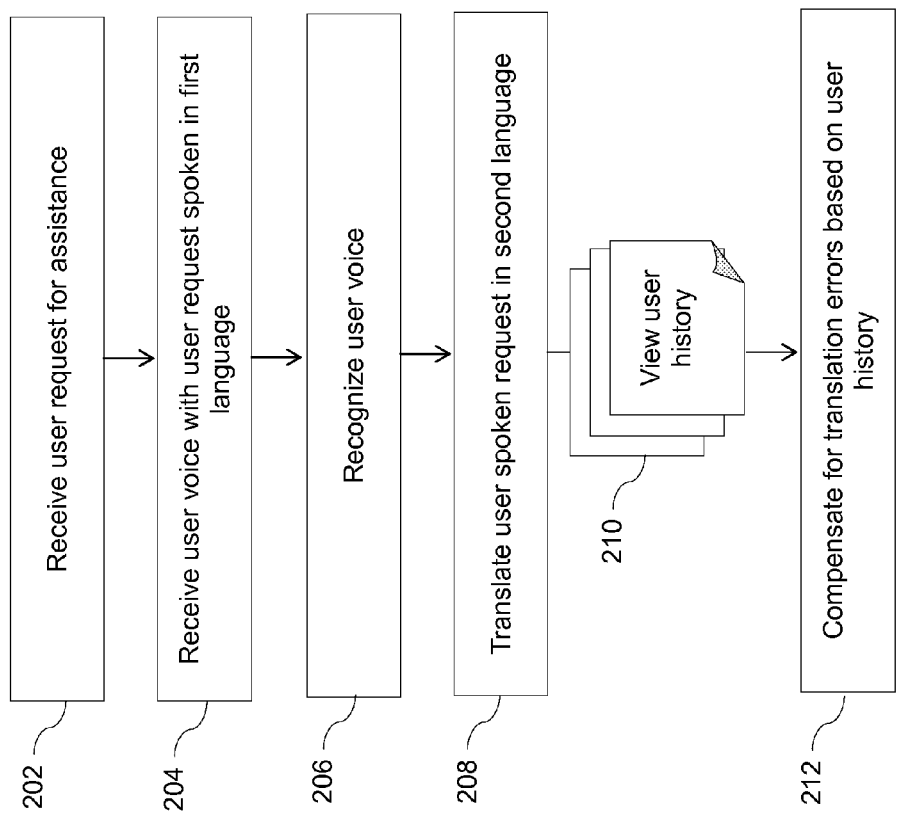
FIG. 2 depicts a diagram, by way of example, but not by way of limitation, a method for converting the user request in a uniform format, according to an embodiment of the present invention.

FIG. 2 depicts a diagram, by way of example, but not by way of limitation, a method 200 for converting the user request in a uniform format, according to an embodiment of the present invention. At 202, the method 200 may allow the computing device, to receive request from the user. In an embodiment, the user may provide the request through the voice or speech. Examples of different types of input data request which may be accessed or utilized by the computing device may include, but are not limited to, voice input, text input, location information coming from sensors or location-based systems, time information from clocks on client devices, automobile control systems, clicking and menu selection, or other input.

In an embodiment, the voice data described herein may be provided such as from mobile devices such as mobile telephones and tablets, computers with microphones, Bluetooth headsets, automobile voice control systems, over the telephone system, recordings on answering services, audio voicemail on integrated messaging services, consumer applications with voice input such as clock radios, telephone station, home entertainment control systems, game consoles, or any other wireless communication application.

In an embodiment, the text input described herein may be provided from keyboards on computers or mobile devices, keypads on remote controls or other consumer electronics devices, email messages, instant messages or similar short messages, text received from players in multiuser game environments, text streamed in message feeds, or any other text input.

In an embodiment, the location information coming from sensors or location-based systems described herein may include for example, but not limited to, Global Positioning System (GPS) and Assisted GPS (A-GPS) on mobile phones. In one embodiment, location information is combined with explicit user input. In one embodiment, the system of the present invention is able to detect when a user is at home, based on known address information and current location determination.

In an embodiment, the time information from clocks on client devices described herein may include, for example, time from telephones or other client devices indicating the local time and time zone. Alternatively, time may be used in the context of user requests, such as for instance, to interpret phrases such as "in an hour" and "afternoon".

In an embodiment, information can come from the compass, accelerometer, gyroscope, or travel velocity data, events, as well as other sensor data from mobile or handheld devices or embedded systems such as automobile control systems. The events described herein may include from sensors and other data-driven triggers, such as alarm clocks, calendar alerts, price change triggers, location triggers, push notification onto a device from servers, and the like.

The computing device may receive the user voice with the user request spoken in a first language such as shown at 204. The first language described herein may include for example, but not limited to, English, Chinese, French, or any other language. At 206, the method 200 may include recognizing the user voice from the user request spoken in the first language. The computing devices may be configured to generate one or more text interpretations of the auditory signal such as to translate the user speech request into text. At 208, the method 200 may allow the computing device to translate the user request spoken in the first language into a second language The second language described herein may include for example, but not limited to, English, Chinese, French, or any other language. In an embodiment, the computing device may use speech-to-text conversation techniques such as to translate the user request spoken in the first language to the second language. In an embodiment, the computing device may be configured to analyze the user voice and may use it to fine tune the recognition of that user voice such as to translate the user request spoken in the first language into the second language. In an embodiment, the integration of speech-to-text and the natural language understanding technology can be constrained by a set of explicit models of domains, tasks, services, and dialogs. Unlike assistant technology that attempts to implement a general-purpose artificial intelligence system, the embodiments described herein may parse the user voice data such as to reduce the number of solutions to a more tractable size. This results in fewer ambiguous interpretations of language, fewer relevant domains, or tasks. The focus on specific domains, tasks, and dialogs also makes it feasible to achieve coverage over domains and tasks with human-managed vocabulary and mappings from intent to services parameters. In an embodiment, the computing device may be configured to be integrated with one or more third-party translation tools such as to translate the user request spoken in the first language into the second language. The one or more third-party translation tools may be any general purpose web translation tool known in art.

At 210A, the method 200 may allow the computing device to view user history such as to translate the user request spoken in the first language into the second language. In an embodiment, the computing device may be configured to use information from personal interaction history, such as for example, but not limited to, dialog history such as previous selections from results, personal physical context such as user's location and time, or personal information gathered in the context of interaction such as name, email addresses, physical addresses, phone numbers, account numbers, preferences, or the like. The computing device may use the user history information such as using personal history and physical context to better interpret the user voice input.

In an embodiment, the computing device may be configured to use dialog history in interpreting the natural language of the user voice inputs. The embodiments may keep personal history and may apply the natural language understanding techniques on the user voice inputs. In an embodiment, the computing may also use dialog context such as current location, time, domain, task step, and task parameters to interpret the new user voice inputs. The ability to use dialog history may make natural interaction possible, one which resembles normal human conversation. In an embodiment, at 212A, the method 200 may allow the computing device to compensate for translation errors based on the user history. The computing device may be configured to use the user history information such as to compensate for the translation errors, while translating the user request spoken in the first language to the second language.

In an embodiment the method 200 also includes correcting the mistranslated content of the user request, in accordance with the user history information. At 202B, the method 200 may allow the computing device such as to translate the user request spoken in the first language into the second language. In an embodiment, the computing device may be configured to be integrated with one or more third-party translation tools such as to translate the user request spoken in the first language into the second language. The one or more third-party translation tools may be any general purpose web translation tool known in art.

In an embodiment, the computing device, in communication with the one or more third-party translators, may use speech-to-text conversation techniques such as to translate the user request spoken in the first language into the second language. In an embodiment, the one or more third-party translators may be configured to analyze the user voice data such as to translate the user request spoken in the first language into the second language. In an embodiment, the integration of the speech-to-text and the natural language understanding technology can be constrained by a set of explicit models of domains, tasks, services, and dialogs. In an embodiment, the method 200 may allow the one or more third-party translators such as to parse the contents of the user voice data and generate one or more interpretations. In an embodiment, the one or more third-party translators may be configured to provide the one or more translated interpretation to the computing device.

The method 200 may include determining whether the translated content provided by the one or more third-party translators is correct, in accordance with the user history stored thereon. In an embodiment, the computing device may be configured to use the user history information such as to determine whether the user voice data is mistranslated, in accordance with the user voice request received from the user. In an embodiment, upon determining that the user voice data is mistranslated, by the one or more third-party translators, the computing device may view the user history information such as to translate the user request spoken in the first language into the second language. In an embodiment, the computing device is configured to use the user history information such as to identify the mistranslation errors, performed by the one or more third-party translators, and correct the mistranslation errors before using it for further processing.

In an embodiment, the computing device may be configured to use information from the user personal interaction history, such as to better interpret the user voice input and correct the mistranslated content provided by the one or more third-party translators. In an embodiment, the computing device may be configured to use dialog history in interpreting the natural language of the user voice inputs and identify the mistranslated content provided by the one or more third-party translators. In an embodiment, the computing may also use dialog context such as current location, time, domain, task step, and task parameters to interpret the new user voice inputs. The ability to use dialog history may make natural interaction possible, one which resembles normal human conversation. In an embodiment, the method 200 may allow the computing device to compensate for mistranslation errors based on the user history. The computing device may be configured to use the user history information such as to compensate for the mistranslation errors, done by the one or more third-party translators, while translating the user request spoken in the first language to the second language. The method 200 may allow the computing device, in communication with one or more servers, to search semantic database on the Internet in the second language.

Figure 3:
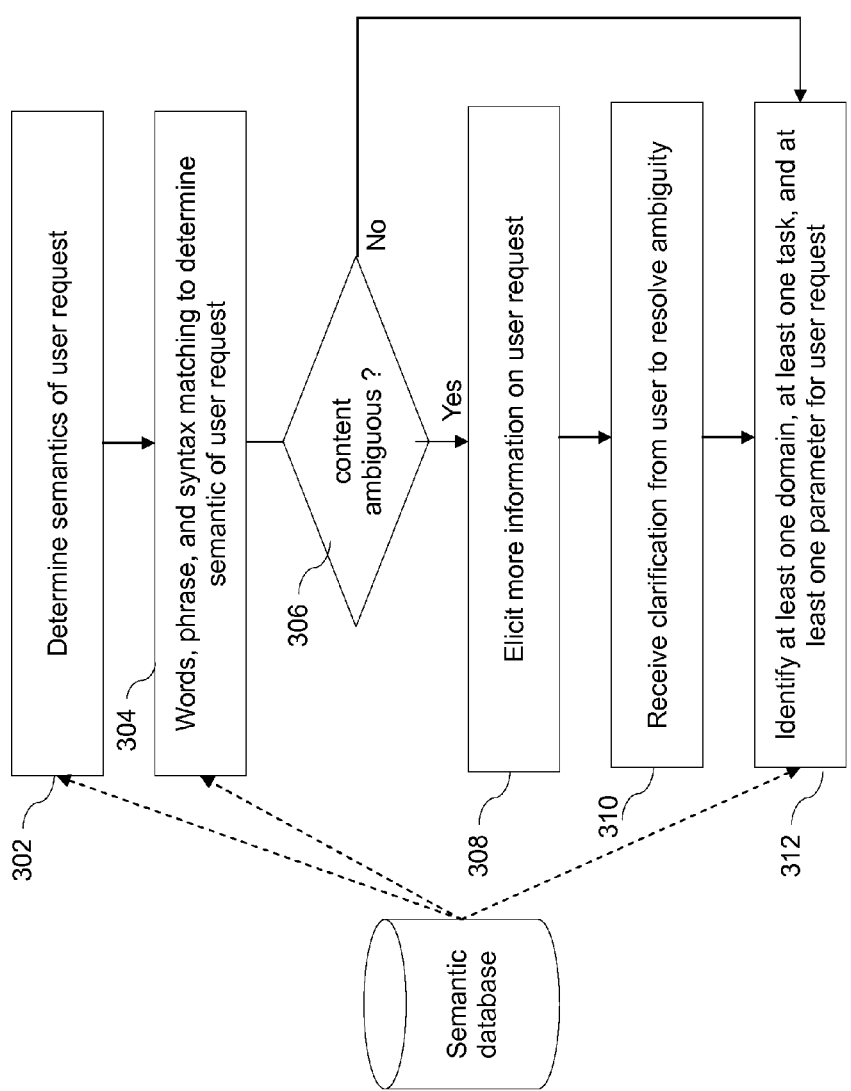
FIG. 3 depicts a diagram, by way of example, but not by way of limitation, a method for natural language processing, according to an embodiment of the present invention.

FIG. 3 depicts a diagram, by way of example, but not by way of limitation, a method 300 for natural language processing, according to an embodiment of the present invention. At 302, the method 300 may allow the computing device to determine semantics of the user request. The computing device may be configured to interpret the spoken voice of the user to determine the semantics of the user request. At 304, the method 300 may allow the computing device to match the word, phrase, or syntax to determine semantics of the user request. The computing device, in communication with the semantic database, may be configured to automatically correct the syntactic or semantic errors identified from the user voice request.

In an embodiment, the computing device may be configured to determine the semantics of the user voice request such as by using the semantic database. In an embodiment, if the user provides a statement "I have a meeting at 1:00 am" as the user voice request, then the computing device in communication with the semantic database may determine the semantics from the triple store such as for example, the text string "I" is the subject, the text string "have a" is the predicate, and the text string "meeting at 1:00 am" is the object. In general, the data types of a subject, predicate, and object can be virtually any type of object (e.g., string, number, pointer, etc.). In an embodiment, the semantic database, such as the triple store database, may be configured to take a large number of triple data and generate different interpretations, which may be sorted according to the triple parts identified from the user voice request. In an embodiment, the initial set of triples, such as the triples as determined above starting with "I have a meeting at 1:00 am" may be stored as the user transaction history log. In an embodiment, the computing device may store the user history user history triples in a random order or a particular initial sorted order, such as determined subject-predicate-object, in accordance with the user voice inputs received from the user.

The different interpretations described herein may be ambiguous or need further clarification such as to facilitate the use of algorithms for efficient interpretation or analysis of the user voice request. At 306, the method 300 may allow the computing device to determine if the user voice data identified from the user request is ambiguous to interpret. In an embodiment, the computing device may use the speech-to-text conversation techniques such as to interpret the user request spoken in the first language. In an embodiment, the computing device may be configured to analyze the user voice and may use it to fine tune the recognition of that the user voice such as to resolve the ambiguities associated with the user request. In an embodiment, the integration of speech-to-text and natural language understanding technology can be constrained by the set of explicit models of domains, tasks, services, and dialogs may allow parsing the user voice data such as to generate better interpretations in accordance with the request spoken in the first language. This results in fewer ambiguous interpretations of language, fewer relevant domains, or tasks. The focus on specific domains, tasks, and dialogs also makes it feasible to achieve coverage over domains and tasks with human-managed vocabulary and mappings from intent to services parameters.

In an embodiment, the triple store database may be configured to retrieve Meta schema information such as to better interpret the user voice data. In an embodiment, the Meta schema may contain the rules and regulations may be determined by the triple store, such as to generate interpretations, in accordance with the request received from the user. In an embodiment, the triple store database may link triple tuples, such as the subject, predicate, and object, to disambiguate the ambiguous interpretations of the user voice request.

In response to determining that the user voice data is ambiguous to interpret, the method 300 may allow the computing device to elicit more information on user request such as shown at 308. In an embodiment, the computing device may be configured to prompt the user for more information on the request such as to resolve the ambiguities from the user voice data. In the embodiment, the computing device may prompt for more information on the request to the user, in communication with the one or more servers. The one or more servers described herein may include components such as, for example, vocabulary sets, language interpreter, dialog flow processor, library of language pattern recognizers, output processor, service capability models, task flow models, domain entity databases, master version of short term memory, master version of long term memory, or the like, such that the computing device may parse and interpret the user voice request. The short and long term memory described herein will be explained in more details in conjunction with FIG. 4.

The input and output data processing functionalities may be distributed among the user and the one or more servers. In an embodiment, the user may maintain a subsets or portions of these components locally, to improve responsiveness and reduce dependence on the network communications. Such subsets or portions may be maintained and updated according to the cache management techniques known in the art. Such subsets or portions include, for example, vocabulary sets, library of language pattern recognizers, master version of short term memory, master version of long term memory, or the like.

At 310, the method 300 may allow the computing device to receive clarification from the user to resolve ambiguity associated with the user voice request. In an embodiment, the user may provide more information to the computing device such as to clarify the ambiguity in interpretation of the user voice request. In an implementation, the method 300 may allow the triple store to generate queries such as to improve the interpretations of the user voice request, in accordance with the clarifications received for the user. In an embodiment, the method 300 may allow the triple store to inversely map the one or more triples by swapping the subject, the predicate, or the object. In an embodiment, the triple (subject, predicate, or object) can be generated by constructing the inverse of the associative triples such as to analyze the better interpretations of the user request, thereby disambiguating the user voice data, in accordance with the clarifications received from the user.

The method 300 may allow the computing device to parse the information received from the user, such as to identify at least two competing semantic interpretations of the user request. At 312, the method may allow the computing device, in communication with the semantic database, to identify at least one domain, at least one task, and at least one parameter for the user request.

In an embodiment, the triple store database may be configured to retrieve the at least one domain, the at least one task, and the at least one parameter, such as by using the Meta schema information, in accordance with the clarifications received from the user. In an embodiment, the triple store database may link the triple tuples such as to identify the at least one matching domain, the at least one matching task, and the at least one matching parameter.

Figure 4:
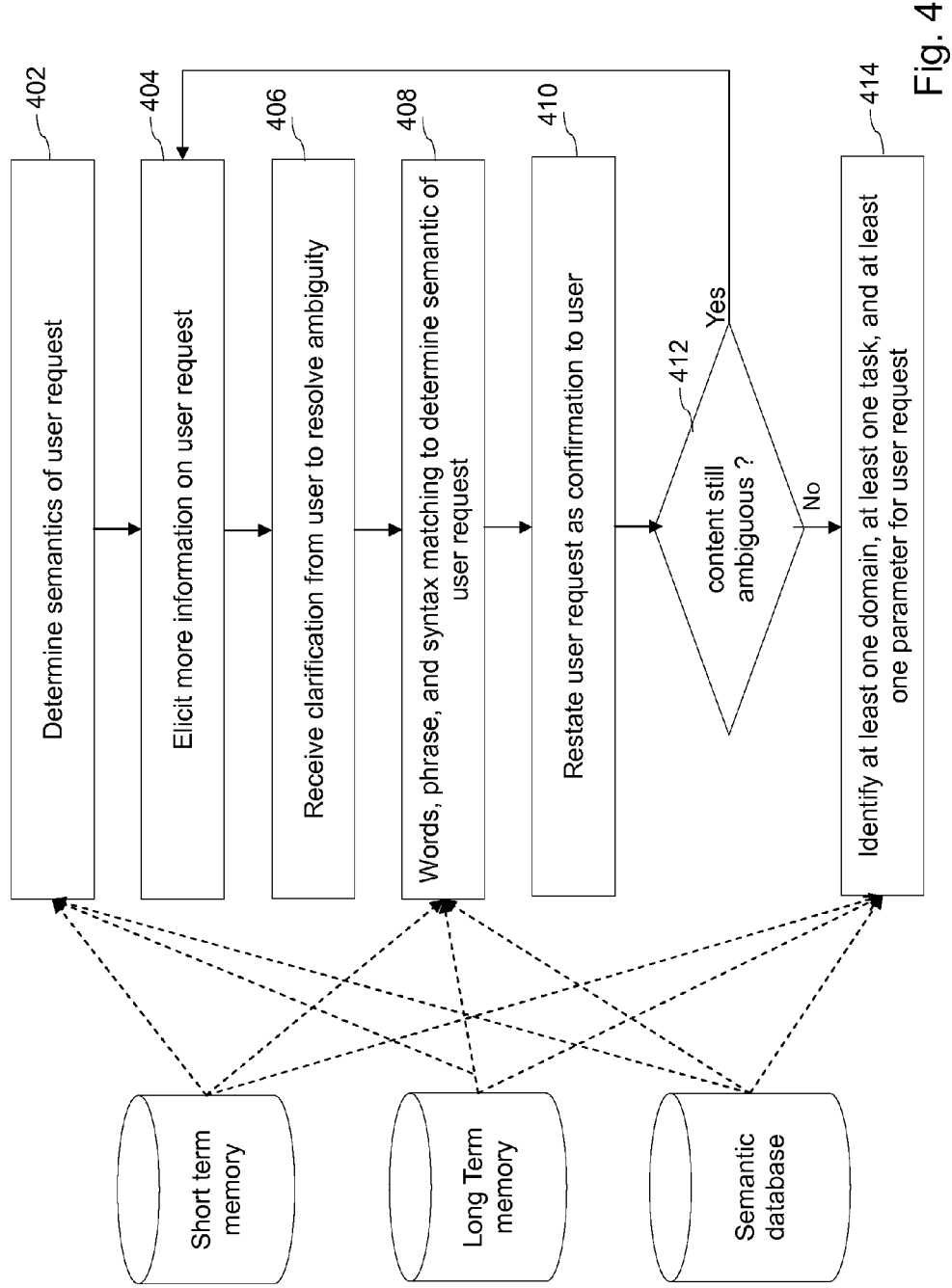
FIG. 4 depicts a diagram, by way of example, but not by way of limitation, a method for resolving ambiguities associated with the user request, according to an embodiment of the present invention.

FIG. 4 depicts a diagram, by way of example, but not by way of limitation, a method 400 for resolving ambiguities associated with the user request, according to an embodiment of the present invention. At 402, the method 400 may allow the computing device to determine semantics of the user request. In an embodiment, the method 400 may allow the computing device to include intelligence beyond simple database applications, such as to determine the semantics of the user request from the user natural voice data request. In an embodiment, the computing device may process a statement of intent in the natural language, such as spoken in the first language.

In an embodiment, the triple store database may be configured to retrieve Meta schema information such as to better interpret the user voice data. In an embodiment, the Meta schema may contain the rules and regulations, which may be implemented by the triple store, such as to generate interpretations, in accordance with the request received from the user. In an embodiment, the triple store database may link triple tuples, such as the subject, predicate, and object, to disambiguate the ambiguous interpretations of the user voice request. In an example, the computing device may allow the triple store to use the combination of triples (subject, predicate, or object) such as to determine the semantics of the user voice request.

For example, if the user provides the statement, such as "Chinese food restaurants", as the user request spoken in the first language to the computing device, then the computing device may use the speech-to-text conversion and the natural language processing techniques to parse the user voice data and determine the semantics of the user request. In an embodiment, the computing device, in communication with the one or more servers, and semantic database, may determine the semantics from the user first language input, such as interpreting the triple as "place", "Chinese food", and "Chinese restaurants". In an embodiment, the one or more servers determined herein may include or be coupled to the short term memory, the long term memory, semantic database, or the like, such as to assist the computing device in determining the semantics, identifying the at least one domain, at least one task, and at least one parameter for user request, searching on the internet for the at least one matching domain, at least one matching task, and at least one matching parameter for user request, responding to the user request, and performing other functions.

In an embodiment, the integration of speech-to-text and natural language understanding technology may be constrained by the set of explicit models of domains, tasks, services, and dialogs, which may allow parsing the user voice statement such as to generate better interpretations of the semantics, in accordance with the request spoken in the first language. In an embodiment, the computing device may not determine accurate interpretations of the semantics of the user request, such as due to ambiguous statements of the user statements spoken in the first language. This may result in fewer ambiguous interpretations of language, fewer relevant domains, or tasks.

In an embodiment, if the computing device, in communication with the one or more servers, and semantic databases, determines the ambiguities are associated with the user request, then the method 400 may allow the computing device, in communication with the one or more servers, to elicit more information on the user request such as shown at step 404. The computing device, in communication with the one or more servers, may prompt for more information, such as to clarify and resolve ambiguities associated with the user request. In an embodiment, the computing device, in communication with the one or more servers, may prompt the user for more information on the user request spoken in first language such as to disambiguate the user voice data requests. For example, in an embodiment where input is provided by speech, the audio signals may be sent to the one or more servers, where words are extracted, and semantic interpretation performed, such as by using the speech-to-text and natural language processing techniques. The one or more servers may then provide alternative words recognized from the user voice data such as to disambiguate the user voice data requests. In an embodiment, the computing device, in communication with the one or more servers, may be configured to elicit more information such as by offering the alternative words to choose among based on their degree of semantic fit to the user.

At 406, the method 400 may allow the computing device to receive clarifications from the user such as to resolve the ambiguities. In an embodiment, the user may select the appropriate words and send to the computing device such as to disambiguate the user voice data requests. At 408, the method 400 may allow the computing device to match the words, phrases, and syntax of the user voice data to determine semantics of user request. In an embodiment, the computing device, in communication with the one or more servers, may recognize for example, idioms, phrases, grammatical constructs, or other patterns in the user voice input such as to determine the semantics of the user request. The one or more servers may use short term memory, which may be used to match any prior input or portion of prior input, or any other property or fact about the history of interaction with the user. In an embodiment, the partial input may be matched against cities that the user has encountered in a session. In one or more embodiments, the semantic paraphrases of recent inputs, request, or results may be matched against the user voice data request and clarification data received from the user. For example, if the user had previously requested "latest news" and obtained concert listing, and then typed "news" in an active input elicitation environment, suggestions may include "latest news" or "concerts.

In an embodiment, the one or more servers may use long term personal memory, which may be used to suggest matching items from the long term memory. Such matching items may include, for example, but not limited to, domain entities that are saved such as favorite restaurants, movies, theatres, venues, and the like, to-do items, list items, calendar entries, people names in contacts or address books, street or city names mentioned in contact or address books, and the like.

In an embodiment, the method 400 may allow the triple store to generate queries such as to improve the interpretations of the user voice request, in accordance with the clarifications received for the user. In an embodiment, the method 400 may allow the triple store to inversely map the one or more triples such as by swapping the subject, the predicate, or the object. In an embodiment, the triple (subject, predicate, or object) may be generated by constructing the inverse of the associative triples such as to analyze the better interpretations of the user request, thereby disambiguating the user voice data, in accordance with the clarifications received from the user.

At 410, the method 400 may allow the computing device to restate the user request as a confirmation to the user. In an embodiment, At 412, the computing device, in communication with the one or more servers, may determine whether the interpretation of the user request such as after clarifying the ambiguities associated with the user voice data, is strong enough to proceed. In an embodiment, if the computing device, in communication with the one or more servers, determines that the semantic interpretation of the user voice request is no more ambiguous then the method 400 may allow the computing device, in communication with the one or more servers, to identify at least one domain, at least one task, or at least one parameter for user request such as shown at step 414. The one or more servers may interact with the semantic database to identify at least one domain, at least one task, and at least one parameter for user request. In an embodiment, the triple store database may be configured to retrieve the at least one domain, the at least one task, and the at least one parameter, such as by using the Meta schema information, in accordance with the clarifications received from the user. In an embodiment, the triple store database may link the triple tuples such as to identify the at least one matching domain, the at least one matching task, and the at least one matching parameter.

In an embodiment, if the computing device, in communication with the one or more servers, determines that the semantic interpretation of the user voice request, such as even after receiving the clarifications from the user to disambiguate the user voice data request, is still ambiguous or sufficient uncertainty, then the method 400 may perform the step 404, such that the computing device may elicit more information from the user to receive clarifications, such as to disambiguate the user request.

Figure 5:
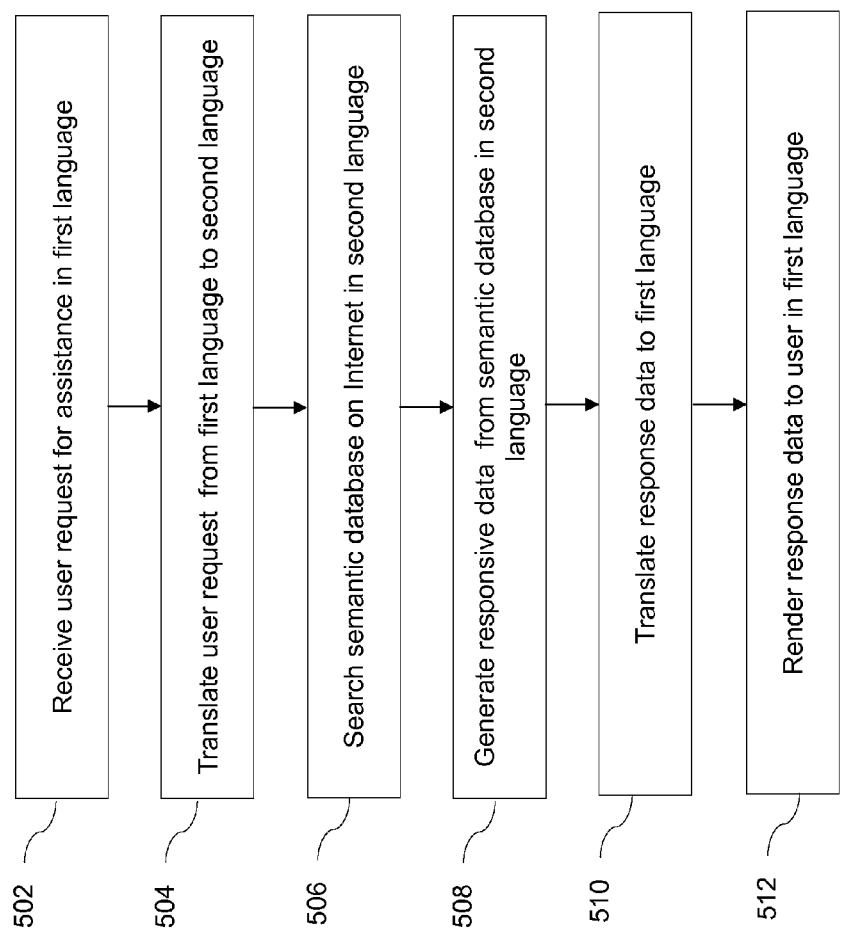
FIG. 5 is depicts a diagram, by way of example, but not by way of limitation, a method for providing assistance to the user, according to an embodiment of the present invention.

FIG. 5 is depicts a diagram, by way of example, but not by way of limitation, a method 500 for providing assistance to the user, according to an embodiment of the present invention. At step 502, the method 500 may allow the computing device, to receive request from the user. In an embodiment, the user may provide the request through the voice or speech. Examples of different types of input data request which may be accessed or utilized by the computing device may include, but are not limited to, voice input, text input, location information coming from sensors or location-based systems, time information from clocks on client devices, automobile control systems, clicking and menu selection, or other input. In an embodiment, the voice data described herein may be provided such as from mobile devices such as mobile telephones and tablets, computers with microphones, Bluetooth headsets, automobile voice control systems, over the telephone system, recordings on answering services, audio voicemail on integrated messaging services, consumer applications with voice input such as clock radios, telephone station, home entertainment control systems, game consoles, or any other wireless communication application.

The computing device may receive the user voice with the user request spoken in the first language. The first language described herein may include for example, but not limited to, English, Chinese, French, or any other language. The method 500 may include recognizing the user voice from the user request spoken in the first language. The computing devices may generate one or more text interpretations of the auditory signal to translate the user speech request into text. At 504, the method 500 may allow the computing device to translate the user request spoken in the first language into a second language. The second language described herein may include for example, but not limited to, English, Chinese, French, or any other language. In an embodiment, the computing device may use speech-to-text conversation techniques to translate the user request spoken in the first language to the second language. In an embodiment, the computing device may be configured to analyze the user voice and may use it to fine tune the recognition of that user voice such as to translate the user request spoken in the first language into the second language.

In an embodiment, the computing device may be configured to be integrated with the one or more third-party translation tools such as to translate the user request spoken in the first language into the second language. In an embodiment, the computing device, in communication with the one or more third-party translators, may use speech-to-text conversation techniques such as to translate the user request spoken in the first language into the second language. In an embodiment, the one or more third-party translators may be configured to analyze the user voice data such as to translate the user request spoken in the first language into the second language. In an embodiment, the integration of the speech-to-text and the natural language understanding technology may be constrained by a set of explicit models of domains, tasks, services, and dialogs. In an embodiment, the method 500 may allow the one or more third-party translators such as to parse the contents of the user voice data and generate one or more interpretations. In an embodiment, the one or more third-party translators may be configured to provide the one or more translated interpretation to the computing device.

In an embodiment the method 500 may include determining whether the translated content provided by the one or more third-party translators is correct, in accordance with the user history stored thereon. In an embodiment, the computing device may be configured to use the user history information such as to determine whether the user voice data is mistranslated, in accordance with the user voice request received from the user. In an embodiment, upon determining that the user voice data is mistranslated, by the one or more third-party translators, the computing device may view the user history information such as to translate the user request spoken in the first language into the second language. In an embodiment, the computing device is configured to use the user history information such as to identify the mistranslation errors, performed by the one or more third-party translators, and correct the mistranslation errors before using it for further processing.

In an embodiment, the method 500 may allow the computing device to compensate for mistranslation errors based on the user history. The computing device may be configured to use the user history information such as to compensate for the mistranslation errors, done by the one or more third-party translators, while translating the user request spoken in the first language to the second language.

At 506, the method 500 may allow the computing device, in communication with the one or more servers, to search semantic database on the Internet in the second language. In an embodiment, the method 500 may search for the at least one matching domain, task and parameter in one of: a semantic hotel database, a semantic restaurant database, a semantic local event database, semantic concert database, a semantic media database, a semantic book database, a semantic music database, a semantic travel database, and a semantic flight database. At 508, the method 500 may allow the computing device to generate responsive data from the semantic database in second language. At 510, the method 500 may include translating the response data generated in second language into the first language. In an embodiment, the computing device, in communication with the one or more servers, may output the uniform representation of response and formats the response according to the device and modality that is appropriate and applicable. In an embodiment, the method 500 may allow the computing device to output or render the translated response in the first language to the user, in accordance with the voice request spoken in first language received from the user such as shown at 512.

Figure 6:
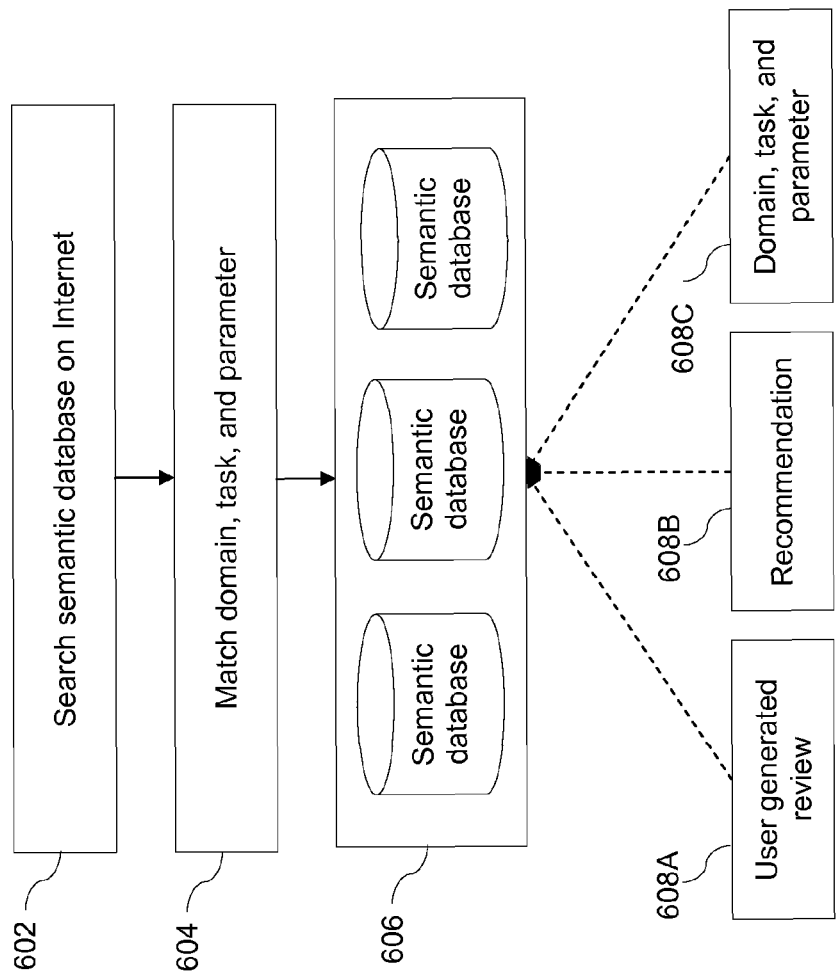
FIG. 6 depicts a diagram, by way of example, but not by way of limitation, a method for searching on Internet for providing assistance to the user, according to an embodiment of the present invention.

FIG. 6 depicts a diagram, by way of example, but not by way of limitation, a method 600 for searching on Internet for providing assistance to the user, according to an embodiment of the present invention. At 602, the method 600 may allow the computing device to search semantic database on the Internet, in accordance with the request received from the user. In an embodiment, the method 600 may search for the at least one matching domain, task, and parameter in one of: a semantic hotel database, a semantic restaurant database, a semantic local event database, semantic concert database, a semantic media database, a semantic book database, a semantic music database, a semantic travel database, a semantic flight database, or the like, such as shown at 604.

At 606, the method 600 may allow the computing device, in communication with the one or more servers, to search for the at least one matching domain, task, and parameter using the short term memory, the short term memory, the semantics database, or the like. In an embodiment, the short term personal memory described herein may be configured to store or implement various types of functions, operations, or actions, such as for example, but not limited to, maintaining a history of the recent dialog between the computing device and the user, maintaining a history of recent selections by the user in the GUI such as which items were opened or explored, which phone numbers were called, which items were mapped, which movie trailers where played, and the like, maintaining the server session or user session state such as web browser cookies or RAM (Random Access Memory) used by the user or other applications, maintaining the list of recent user requests, maintaining the sequence of results of recent user requests, maintaining the click-stream history of UI events such as including button presses, taps, gestures, voice activated triggers, or any other user input, maintaining the computing device sensor data such as location, time, positional orientation, motion, light level, sound level, and the like. These functions, operations, or actions may be used by the one or more servers such as to search for the at least one matching domain, task, and parameter, in accordance with the request received from the user.

In an embodiment, the short term personal memory described herein may be configured to store or implement various types of functions, operations, or actions, such as for example, but not limited to maintaining the personal information and data about the user such as for example the user preferences, identity information, authentication credentials, accounts, addresses, or the like, maintaining information that the user has collected by the computing device such as the equivalent of bookmarks, favorites, clippings, or the like, maintaining saved lists of business entities including restaurants, hotels, stores, theatres, or other venues.

In an embodiment, the long-term personal memory may be configured to store information such as to bring up a full listing on the entities including phone numbers, locations on a map, photos, movies, videos, music, shows, the user's personal calendar(s), to do list(s), reminders and alerts, contact databases, social network lists, shopping lists and wish lists for products and services, coupons and discount codes acquired, the history and receipts for transactions including reservations, purchases, tickets to events, and the like. These functions, operations, or actions may be used by the one or more servers such as to search for the at least one matching domain, task, and parameter, in accordance with the request received from the user.

The one or more servers can be configured to use the short term memory, the long term memory, or the semantic database, in communication or a combination of portions to search for the at least one matching domain, task, and parameter, in accordance with the request received from the user. In an embodiment, the short term memory, the long term memory, or the semantic database may include user generated reviews, recommendations or suggestions, domains, tasks, and parameters, or the like, such as to provide personalized response to the client in accordance with the request received from the user, such as shown at 608A, 608B, and 608C.

At 608A, 608B, and 608C, in various embodiments, the semantic database, such as triple store database disclosed herein may be configured to integrate with various sites on the Internet such as to provide intelligent automated assistance to the user in accordance with the request received from the user. In an embodiment, the triple store database may be configured to integrate, implement, or combine information about one or more products from several review and recommendation sites. The review and recommendation described herein may be provided by the one or more users such as to check prices and availability from multiple distributors, and check their locations and time constraints, and help a user find a personalized solution to their problem.

In an embodiment, the triple store database may be configured to include functionality for automating the use of review and recommendation services available over the Internet. In an embodiment, the triple store database may be configured to store review and recommendation information related to, for example, but not limited to, things to do such as movies, events, performances, exhibits, shows and attractions, or the like. In an embodiment, the triple store database may be configured to store review and recommendation information related to, for example, but not limited to, places to go including such as, but not limited to, travel destinations, hotels and other places to stay, landmarks and other sites of interest, or the like. In an embodiment, the triple store database may be configured to store review and recommendation information related to, for example, but not limited to, places to eat or drink such as restaurants, bars, or the like.

In an embodiment, the triple store database may be configured to store review and recommendation information related to, for example, but not limited to, time or place to meet others, and any other source of entertainment or social interaction which may be found on the Internet. In an embodiment, the method 600 may allow the computing device, in communication with the one or more servers, to use the user review and recommendation information, stored on the triple store database, such as to provide user personalized response, in accordance with the request received from the user.

In an embodiment, the triple store may integrate with third-party social cloud or networking applications such as to store the recommendation ratings such as the user like, unlike, the user awarded reward point or stars, such as to recommend or suggest the user response(s), in accordance with the request received from the user. In an embodiment, upon receiving the request from the user, the triple store may be configured to generate queries related to the user request and take into account the knowledge about the recommendations and reviews stored thereon, such as to generate the response(s) for the user.

In an embodiment, if the user request indicating "Indian food restaurants in San Francisco", then the triple store may be configured to link the triple tuples (the combination of subject, predicate, or object) such as to generate the response(s) for the user request. In an embodiment, the triple store database may be configured to link the semantics of the user request (such as the triple tuples) with the recommendations identified from the third party sources such as to generate response for the user request. For example, the triple store database, in communication with the one or more servers, may be configured to determine if the triple tuples (such as for example, the subject as "Indian food", predicate as "restaurants", or object as "in San Francisco" determined from the user voice request) meets with any of the recommendation criteria, such as for example, if the restaurant rating of 5 meets the recommended=yes criteria, and "Indian food" meets the "in San Francisco" criteria. In an embodiment, one or more recommendations criteria may match with the user request such that the one or more responses may be generated.

Figure 7:
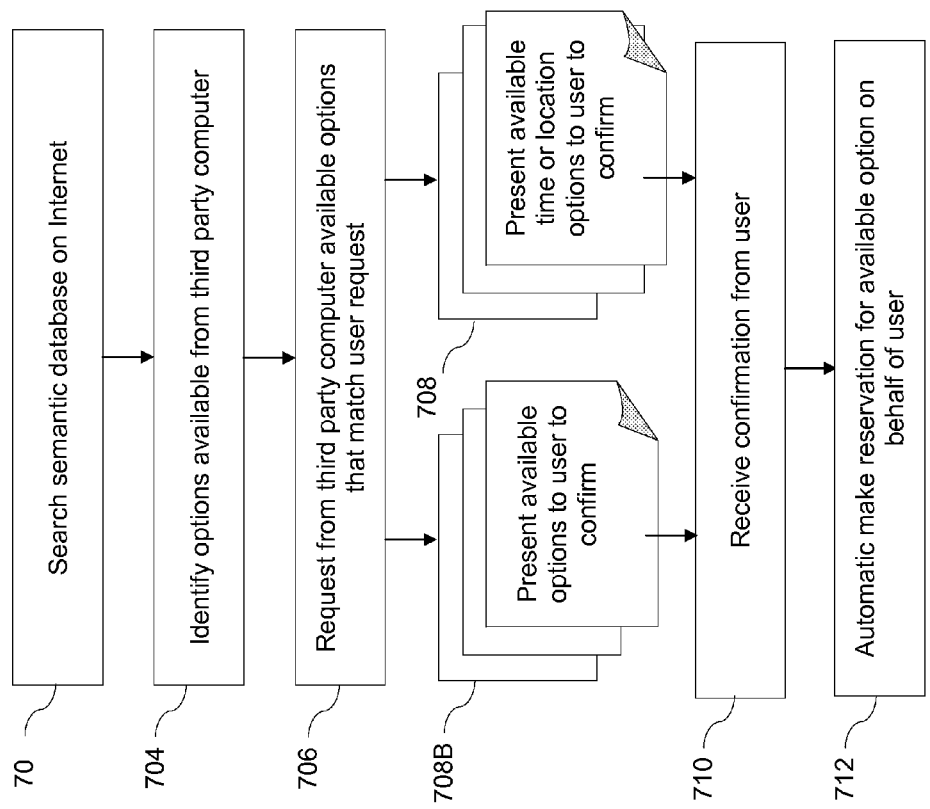
FIG. 7 depicts a diagram, by way of example, but not by way of limitation, a method for reserving options for the user, according to an embodiment of the present invention.

FIG. 7 depicts a diagram, by way of example, but not by way of limitation, a method 700 for reserving options for the user, according to an embodiment of the present invention. The method 700 may allow the computing device, in communication with the one or more servers, to search semantics on the Internet. In an embodiment, the or more server may search for the at least one matching domain, task and parameter in one of: a semantic hotel database, a semantic restaurant database, a semantic local event database, semantic concert database, a semantic media database, a semantic book database, a semantic music database, a semantic travel database, a semantic flight database, or any other database. At 704, the method 700 may allow, the computing device, in communication with the one or more servers, to identify options available from a third party computer for the user. In an embodiment, the one or more servers may be configured to request from the third party computer for available options that match the user request.

In an embodiment, the one or more servers can be configured to identify available service options from the third parties over the Internet, such as the service option available for travel destinations, hotels, restaurants, bars, pubs, entertainment sites, landmarks, summer camps, resorts, movies, theatres, venues, to-do items, list items, or any other service in accordance with the user request. The selection of the services may include for example, but not limited to, a set services which lists service matching name, location, or other constraints, a set of service rating which return rankings for named service, a set of service reviews which returns written reviews for named service, a geo-coding service to locate services on a map, a reservation service, or the like.

At 706, the method 700 may allow the one or more servers to request from the third parties for available options that may match the user request. In an embodiment, the one or more servers can be configured to request the third parties for available service options over the Internet, such as the service option available for travel destinations, hotels, restaurants, bars, pubs, entertainment sites, landmarks, summer camps, resorts, movies, theatres, venues, to-do items, list items, or any other service in accordance with the user request.

At 708A, the method 700 may allow the computing device to present available options to the user for confirmation. In an embodiment, the computing device, in communication with the one or more servers, may be configured to receive the available options from the third parties, in accordance with the request for the user. At 708B, the method 700 may allow the computing device to present available time or location options to the user for confirmation. In an embodiment, the computing device, in communication with the one or more servers, may be configured to receive the available time or location options from the third parties, in accordance with the user request.

At 710, the method 700 may allow the computing device, in communication with the one or more servers, to receive confirmation from the user. The computing device, in communication with the one or more servers, may be configured to automatically make reservation for the available option on behalf of the user, in accordance with the information received from the user such as shown at 712.

In an embodiment, if the user requests for "reservation of a movie ticket" then the computing device, in communication with the one or more servers, to parse the contents of the user request and sent a request to the third parties over the Internet such as to receive the available options in accordance with the request received from the user. The third parties may be configured to provide the available options such as location of theatres, show timings, available seats, or the like to the computing device. The computing device may be configured to present the received options to the user. The computing device, in communication with the one or more servers, to reserve the available options in accordance with the confirmation received from the user.

FIG. 8 depicts a diagram, by way of example, but not by way of limitation, a method 800 for handling user request for assistance, according to an embodiment of the present invention. At 802, the method 800 may allow the computing device to receive user voice request spoken in the first language. In an embodiment, the user may provide the request through the voice or speech. Examples of different types of input data request which may be accessed or utilized by the computing device may include, but are not limited to, voice input, text input, location information coming from sensors or location-based systems, time information from clocks on client devices, automobile control systems, clicking and menu selection, or other input.

The computing device may receive the user voice with the user request spoken in the first language. The first language described herein may include for example, but not limited to, English, Chinese, French, or any other language. The method 800 may include recognizing the user voice from the user request spoken in the first language. The computing devices may generate one or more text interpretations of the auditory signal to translate the user speech request into text. At 804, the method 800 may include forwarding the user voice request to call centre agent to handle the user request. At 806, the computing device, in communication with the one or more servers, may be configured to parse the user voice request spoken in the first language such as to identify the semantics associated with the user request.

At 808, the method 800 may include identifying the semantic interpretations of user request. In an embodiment, the method 800 may allow the computing device to include intelligence beyond simple database applications, such as to determine the semantics of the user request from the user natural voice data request. In an embodiment, the computing device may process a statement of intent in a natural language spoken in the first language. For example, if the user provides the statement, such as "Meeting on 8$^{th}$ March", as the user request spoken in the first language to the computing device, then the computing device may use the speech-to-text conversion and the natural language processing techniques to parse the user voice data and determine the semantics of the user request. In an embodiment, the computing device, in communication with the one or more servers and semantic database, may determine the semantics from the user first language input, such as interpreting "Meeting" and "calendar date 8$^{th}$ March".

In an embodiment, the one or more servers determined herein may include for example, short term memory, long term memory, or the like. In an embodiment, the one or more servers described herein may include or be coupled to the semantic database, such as assist the computing device in determining the semantics, identifying at least one domain, at least one task, and at least one parameter for user request, searching on the internet, responding to the user request, and performing or the like functionalities.

In an embodiment, the integration of speech-to-text and natural language understanding technology may be constrained by the set of explicit models of domains, tasks, services, and dialogs, which may allow parsing the user voice statement such as to generate better interpretations of the semantics, in accordance with the request spoken in the first language. In an embodiment, the computing device may not determine accurate interpretations of the semantics of the user request, such as due to ambiguous statements of the user statements spoken in the first language. This may results in fewer ambiguous interpretations of language, fewer relevant domains, or tasks.

In an embodiment, if the computing device, in communication with the one or more servers, and semantic databases, determines that the ambiguities are associated with the user request, then the method 800 may allow the computing device, in communication with the one or more servers, to elicit more information on the user request. The computing device, in communication with the one or more servers, may prompt for more information, such as to clarify and resolve ambiguities associated with the user request. In an embodiment, the computing device, in communication with the one or more servers, may prompt the user for more information on the user request spoken in first language such as to disambiguate the user voice data requests. For example, in an embodiment where the input is provided by the speech, the audio signals may be sent to the one or more servers, where the words are extracted, and semantic interpretation performed, such as by using the speech-to-text and natural language processing techniques. The one or more servers may then provide alternative words recognized from the user voice data such as to disambiguate the user voice data requests. In an embodiment, the computing device, in communication with the one or more servers, may be configured to elicit more information such as by offering the alternative words to choose among based on their degree of semantic fit to the user.

At 810, the method 800 may allow the computing device to receive clarifications from user to resolve the ambiguities associated with the user request. In an embodiment, the user may select the appropriate words and send to the computing device such as to disambiguate the user voice data requests. In an embodiment, the method 800 may allow the computing device, in communication with the one or more servers, to determine whether the interpretation of the user request such as after clarifying the ambiguities associated with the user voice data, is strong enough to proceed.

At 812, the method 800 may allow the computing device to translate the user request spoken in the first language into a second language. The second language described herein may include for example, but not limited to, English, Chinese, French, or any other language. In an embodiment, the computing device may use speech-to-text conversation techniques to translate the user request spoken in the first language to the second language. In an embodiment, the computing device may be configured to analyze the user voice and may use it to fine tune the recognition of that user voice, such as to translate the user request spoken in the first language into the second language.

At 814, the method 800 may allow the computing device to view user history such as to translate the user request spoken in the first language into the second language. In an embodiment, the computing device may be configured to use information from personal interaction history, such as for example, but not limited to, dialog history such as previous selections from results, personal physical context such as user's location and time, or personal information gathered in the context of interaction such as name, email addresses, physical addresses, phone numbers, account numbers, preferences, or the like. The computing device may be configured to use the user history information, such as using personal history and physical context to better interpret the user voice input.

In an embodiment, the computing device may be configured to use dialog history in interpreting the natural language of user voice inputs. The embodiments may keep personal history and apply natural language understanding on user voice inputs. In an embodiment, the computing device may also be configured to use dialog context such as current location, time, domain, task step, and task parameters to interpret the new user voice inputs. The ability to use dialog history may make natural interaction possible, one which resembles normal human conversation. In an embodiment, the method 800 may allow the computing device to compensate for translation errors based on user history. The computing device may be configured to use the user history information to compensate for the translation errors, while translating the user request spoken in the first language to the second language.

At 816, the method 800 may allow the computing device, in communication with the one or more servers, to search semantic database on the Internet in second language. In an embodiment, the method 500 may search for the at least one matching domain, task, and parameter in one of: a semantic hotel database, a semantic restaurant database, a semantic local event database, semantic concert database, a semantic media database, a semantic book database, a semantic music database, a semantic travel database, and a semantic flight database. At 818, the method 800 may allow the computing device to generate responsive data from the semantic database in the second language. At 820, the method 800 may include translating the response data generated in the second language into the first language. In an embodiment, the computing device, in communication with the one or more servers, may output the uniform representation of response and format the response according to the device and modality that is appropriate and applicable. In an embodiment, the method 800 may allow the computing device to output or render the translated response in the first language to the user, in accordance with the voice request spoken in the first language received from the user.

FIG. 9 depicts a diagram, by way of example, but not by way of limitation, a method 900 for providing response to the user, according to an embodiment of the present invention. At 902, the method 900 may allow the computing device to search the semantic database on the Internet, in accordance with the request received from the user. In an embodiment, the method 900 may search for the at least one matching domain, task, and parameter in one of: a semantic hotel database, a semantic restaurant database, a semantic local event database, semantic concert database, a semantic media database, a semantic book database, a semantic music database, a semantic travel database, a semantic flight database, or the like, such as shown at 904.

At 906, the method 900 may allow the computing device, in communication with the one or more servers, to suggest possible responses to the user in accordance with the user request. In an embodiment, the computing device may be configured to provide the possible response options to the user such to choose among ambiguous alternative interpretations in accordance with the user request. The computing device may be configured to receive desired response option from the user. In an embodiment, the user may select a suggested response such as shown at 908. In an embodiment, the received input may indicate the desired response for the user which may be converted to the uniform format.

At 910, the method 900 may allow the computing device to generate responsive data from the semantic database in the second language. At 912, the method 900 may include translating the response data generated in the second language into the first language. In an embodiment, the computing device, in communication with the one or more servers, may output the uniform representation of response and format the response according to the device and modality that is appropriate and applicable. In an embodiment, the method 900 may allow the computing device to output or render the translated response in the first language to the user, in accordance with the voice request spoken in first language received from the user such as shown at 914.

Figure 10B:
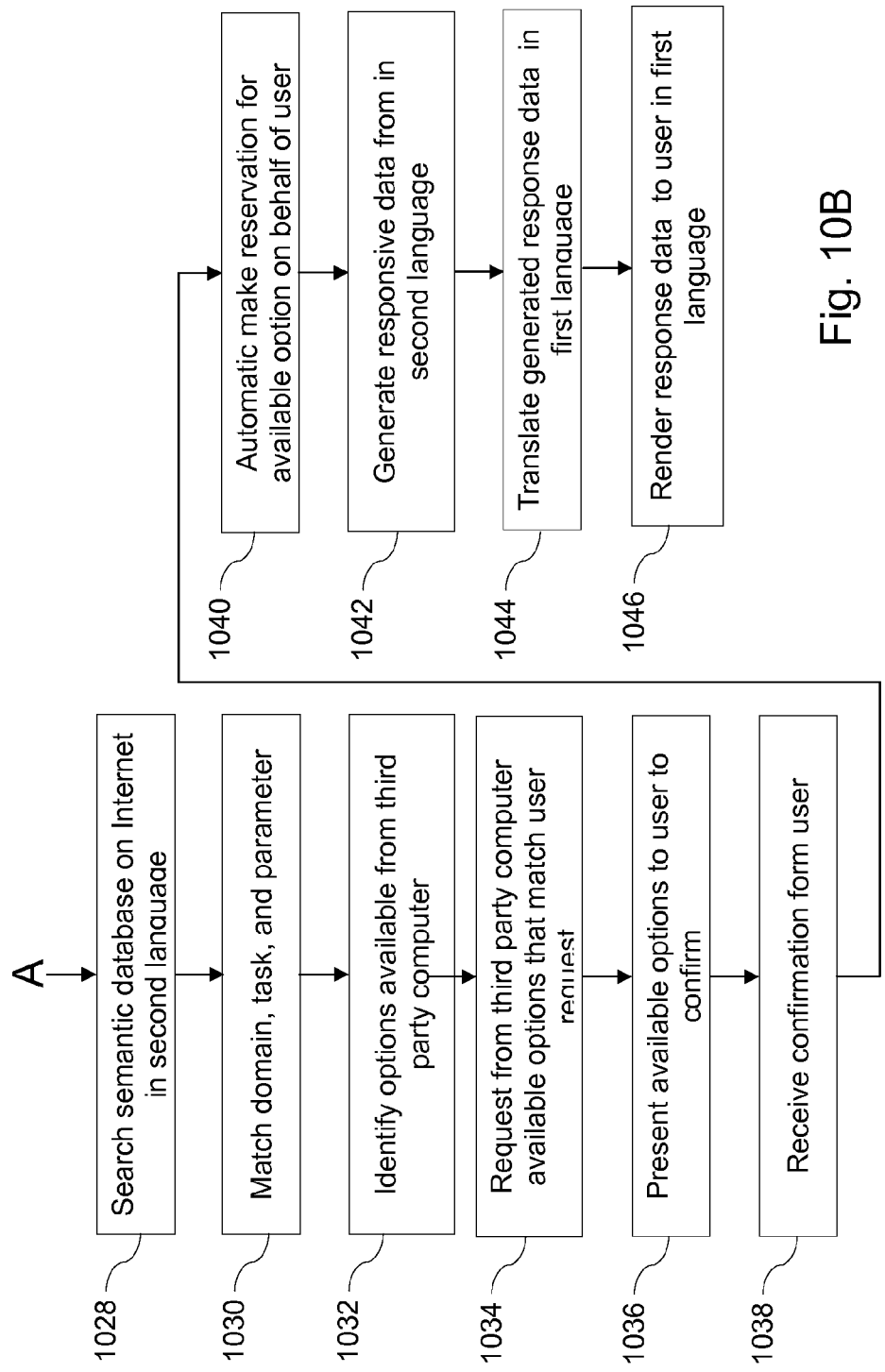

FIGS. 10A and 10B depicts a diagram, by way of example, but not by way of limitation, a method 1000 for providing user personalized response in accordance with the request received from the user for assistance, according to an embodiment of the present invention. At 1002, the method 1000 may allow the computing device to receive user voice request spoken in the first language. In an embodiment, the user may provide the request through the voice or speech. Examples of different types of input data request which may be accessed or utilized by the computing device may include, but are not limited to, voice input, text input, location information coming from sensors or location-based systems, time information from clocks on client devices, automobile control systems, clicking and menu selection, or other input.

The computing device may receive the user voice with the user request spoken in the first language. The first language described herein may include for example, but not limited to, English, Chinese, French, or any other language. The method 1000 may include recognizing the user voice from the user request spoken in the first language. The computing devices may generate one or more text interpretations of the auditory signal to translate the user speech request into text. At 1004, the method 1000 may include forwarding the user voice request to call centre agent to handle the user request. In an embodiment, the agent may receive the request through a gateway server. In an embodiment, the agent may receive the computing device information such as device identifier to uniquely identify the computing device.

The method 1000 may include recognizing the user voice from the user request spoken in the first language. In an embodiment, the method 1000 may allow the call centre agent to create a remote session such as to communicate with the triple store database, in accordance with the request received from the user. In an embodiment, the method 1000 may allow the agent to use the software or portal applications installed thereon such as to communicate with the triple store database. The computing devices may be configured to generate one or more text interpretations of the auditory signal to translate the user speech request into text. At 1006, the method 1000 may allow the computing device to translate the user request spoken in the first language into a second language. The second language described herein may include for example, but not limited to, English, Chinese, French, or any other language. In an embodiment, the call center agent, in communication with the computing device, may use speech-to-text conversation techniques to translate the user request spoken in the first language to the second language. In an embodiment, the computing device may be configured to analyze the user voice and may use it to fine tune the recognition of that user voice such as to translate the user request spoken in the first language into the second language. In an embodiment, the integration of speech-to-text and natural language understanding technology can be constrained by a set of explicit models of domains, tasks, services, and dialogs.

In an embodiment, the method 1000 may allow the call center agent to view the user history such as to translate the user request spoken in the first language into the second language. In an embodiment, call center agent, in communication with the computing device, may use the dialog history in interpreting the natural language of user voice inputs. The embodiments may allow the agent to keep track of the user personal history and apply natural language understanding on the user voice inputs. In an embodiment, the call center agent, in communication with the computing device, may also use dialog context such as current location, time, domain, task step, and task parameters to interpret the new user voice inputs. The ability to use dialog history may make natural interaction possible, one which resembles normal human conversation. In an embodiment, the voice to text transcription services (such as for example, offered by Google Voice) may be employed to translate the user request and generate corresponding digital data. In an embodiment, the call centre agent may submit such data to triple store database such as to retrieve the semantic data related to the user request and provide relevant responses to the user, in accordance with the request received from the user. In an embodiment, the method 1000 may allow the computing device to integrate with the one or more third-party translation tools such as to translate the user request spoken in the first language into the second language. In an embodiment, the call center agent, in communication with the one or more third-party translators, may use speech-to-text conversation techniques such as to translate the user request spoken in the first language into the second language. In an embodiment, the one or more third-party translators may be configured to analyze the user voice data such as to translate the user request spoken in the first language into the second language. In an embodiment, the integration of the speech-to-text and the natural language understanding technology can be constrained by a set of explicit models of domains, tasks, services, and dialogs. In an embodiment, the method 1000 may allow the one or more third-party translators such as to parse the contents of the user voice data and generate one or more interpretations. In an embodiment, the one or more third-party translators may be configured to provide the one or more translated interpretation to the computing device.

In an embodiment of the method 1000, the call center agent can determine whether the translated content provided by the one or more third-party translators is correct, in accordance with the user history stored thereon. In an embodiment, the call center agent can use the user history information such as to determine whether the user voice data is mistranslated, in accordance with the user voice request received from the user. In an embodiment, upon determining that the user voice data is mistranslated, by the one or more third-party translators, the computing device may view the user history information such as to translate the user request spoken in the first language into the second language. In an embodiment, the computing device is configured to use the user history information such as to identify the mistranslation errors, performed by the one or more third-party translators, and correct the mistranslation errors before using it for further processing.

In an embodiment, the method 1000 may allow the computing device to compensate for mistranslation errors based on the user history. The call center agent may allow the computing device to use the user history information such as to compensate for the mistranslation errors, done by the one or more third-party translators, while translating the user request spoken in the first language to the second language.

In an embodiment, at 1008, the method 1000 may allow the call center agent, in communication with the computing device, to compensate for translation errors based on user history. The computing device may be configured to use the user history information to compensate for the translation errors, while translating the user request spoken in the first language to the second language.

At 1010, the method 1000 may allow the call center agent, in communication with the computing device, to determine semantics of the user request. In an embodiment, the method 1000 may allow the computing device to include intelligence beyond simple database applications, such as to determine the semantics of the user request from the user natural voice data request. In an embodiment, the computing device may process a statement of intent in the first language. In an embodiment, the method 1000 may allow the call centre agent to construct queries, in accordance with the request received from the user. In an embodiment, the call centre agent in communication with the one or more servers, may parse these queries such as to convert it into HTTP Get queries on the Internet and to look for possible responses, recommendations and other metadata on the triple store database.

In an embodiment, the one or more servers determined herein may include for example, the short term memory, the long term memory, semantic database, or the like. In an embodiment, the one or more servers described herein may include or be coupled to the short term memory, the long term memory, semantic database, such as to assist the computing device in determining the semantics, identifying the at least one domain, at least one task, and at least one parameter for user request, searching on the internet for the at least one matching domain, at least one matching task, and at least one matching parameter for user request, responding to the user request, and performing other functions.

In an embodiment, the method 1000 may allow the the call center agent, in communication with computing device, to determine the semantics of the user voice request such as by using the semantic database. In an embodiment, if the user provides a statement "Tomorrow wake me up at 5:30 am" as the request, then the computing device in communication with the semantic database may determine the semantics from the triple store such as for example, the text string "Tomorrow" is the subject, the text string "wake me up" is the predicate, and the text string "5:30 am" is the object. In an embodiment, the semantic database, such as the triple store database, may be configured to take a large number of triple data and generate sorted indices based on the triple parts such as to facilitate the use of algorithms for efficient interpretation or analysis of the user voice request.

At 1012, the method 1000 may allow the call center agent, in communication with the computing device, to match the word, phrase, or syntax to determine semantics of the user request. The computing device, in communication with the semantic database, may be configured to automatically correct the syntactic or semantic errors identified from the user voice request. In an embodiment, the integration of speech-to-text and natural language understanding technology may be constrained by the set of explicit models of the domains, tasks, services, and dialogs, which may allow parsing the user voice statement such as to generate better interpretations of the semantics, in accordance with the request spoken in the first language. In an embodiment, the triple store may create semantic mashups of data, such as to retrieve the semantic contents, in accordance with the request received from the user. In an implementation, the triple store database may create the semantic mashups such as by discovering the stored semantic data in the triple tuples, which may represent the same object. In an implementation, the semantic mashups described herein may configure in way that is semantically precise and easily understandable by the call center agents.

At 1014, the method 1000 may allow the call center agent, in communication with the computing device, to determine if the user voice data identified from the user request is ambiguous to interpret. In an embodiment, the computing device may use the speech-to-text conversion techniques such as to interpret the user request spoken in the first language. In an embodiment, the computing device may be configured to analyze the user voice and may use it to fine tune the recognition of that user voice such as to resolve the ambiguities associated with the user request. In an embodiment, the integration of speech-to-text and natural language understanding technology can be constrained by the set of explicit models of domains, tasks, services, and dialogs may allow parsing the user voice data such as to generate better interpretations in accordance with the request spoken in the first language. In an embodiment, the computing device may not determine accurate interpretations of the semantics of the user request, such as due to ambiguous statements of the user statements spoken in the first language. This may results in fewer ambiguous interpretations of language, fewer relevant domains, or tasks.

In an embodiment, if the computing device, in communication with the one or more servers, determines that the semantic interpretation of the user voice request is not ambiguous or strong enough to proceed, then the method 1000 may allow the computing device to identify the at least one domain, at least one task, and at least one parameter for user request such as shown at 1026.

In an embodiment, if the call center agent, in communication with the one or more servers, determines that the ambiguities are associated with the user request then the method 1000 may allow the call center agent, in communication with the one or more servers, to elicit more information on the user request such as shown at step 1016. The the call center agent, in communication with the one or more servers, may prompt for more information, such as to clarify and resolve the ambiguities associated with the user request. In an embodiment, the call center agent, in communication with the one or more servers, may prompt the user for more information on the user request spoken in first language such as to disambiguate the user voice data requests.

In an embodiment, where the input is provided by the speech, the audio signals may be sent to the one or more servers, where the words are extracted, and semantic interpretation is performed, such as by using the speech-to-text and natural language processing techniques. The one or more servers may then provide alternative words recognized from the user voice data such as to disambiguate the user voice data requests. In an embodiment, the call center agent, in communication with the one or more servers, may be configured to elicit more information such as by offering the alternative words to choose among based on their degree of semantic fit to the user.

At 1018, the method 1000 may allow the call center agent, in communication with the computing device, to receive clarifications from the user such as to resolve the ambiguities. In an embodiment, the user may select the appropriate words and send to the computing device such as to disambiguate the user voice data requests. In an embodiment, the method 1000 may allow the call centre agent to use the input data, such as the clarifications received from the user to search on the triple store and construct new queries. In an embodiment, the call centre agent in communication with the one or more servers, may parse these queries such as to convert it into HTTP Get queries on the Internet and to look for possible responses, recommendations and other metadata on the triple store database.

At 1020, the method 1000 may allow the computing device to match the words, phrases, and syntax of the user voice data to determine semantic of user request. In an embodiment, the computing device, in communication with the one or more servers, may recognize for example, idioms, phrases, grammatical constructs, or other patterns in the user voice input such as to determine the semantics. The one or more servers may use short term memory, which may be used to match any prior input or portion of prior input, or any other property or fact about the history of interaction with the user. In an embodiment, the one or more servers may use long term personal memory, which may be used to suggest matching items from the long term memory. At 1022, the method 1000 may allow the call center agent, in communication with the computing device, to restate the user request as a confirmation to the user. In an example, the agent may probe the request to the user such as to confirm the request in accordance with the clarifications received from the user. In an embodiment, at 1024, the call center agent, in communication with the one or more servers, may determine whether the interpretation of user request such as after clarifying the ambiguities associated with the user voice data, is strong enough to proceed. In an embodiment, if the call center agent, in communication with the one or more servers, determines that the semantic interpretation of the user voice request is no longer ambiguous then the method 1000 may allow the computing device, in communication with the one or more servers, to identify at least one domain, at least one task, or at least one parameter for user request such as shown at step 1026. The one or more servers may interact with the semantic database to identify at least one domain, at least one task, and at least one parameter for user request.

In an embodiment, if the call center agent, in communication with the one or more servers, determines that the semantic interpretation of the user voice request, such as even after receiving the clarifications from the user to disambiguate the user voice data request, is still ambiguous or sufficiently uncertain, then the method 1000 may perform the step 1016, such that the call center agent may elicit more information from the user to receive clarifications, such as to disambiguate the user request.

At 1028, the method 1000 may allow the call center agent, in communication with the computing device, to search semantic database on the Internet, in accordance with the request received from the user. In an embodiment, the method 1000 may search for the at least one matching domain, task, and parameter in one of: a semantic hotel database, a semantic restaurant database, a semantic local event database, semantic concert database, a semantic media database, a semantic book database, a semantic music database, a semantic travel database, a semantic flight database, or the like, such as shown at 1030. In an embodiment, the method 1000 may allow the call centre agent to use the converted HTTP Get queries such as to search on the Internet and to look for the at least one matching domain, task, and parameter on the triple store database.

In an embodiment, the method 1000 with the semantic database, such as triple store database disclosed herein may be configured to integrate with various sites on the Internet such as to provide intelligent automated assistance to the user in accordance with the request received from the user. In an embodiment, the triple store database may be configured to integrate, implement, or combine information about one or more products from several review and recommendation sites. The review and recommendation described herein may be provided by the one or more users such as to check prices and availability from multiple distributors, and check their locations and time constraints, and help a user find a personalized solution to their problem.

In an embodiment, method 1000 may allow the call center agent, in communication with the one or more servers, to search for the at least one matching domain, task, and parameter using the short term memory, the long term memory, the semantics database, or the like. In an embodiment, the short and long term personal memory described herein may be configured to store or implement various types of functions, operations, or actions, such as to search the at least one matching domain, task, and parameter, in accordance with the request received from the user.

In an embodiment, the one or more servers can be configured to use the short term memory, the long term memory, or the semantic database, in communication or a combination of portions to search for the at least one matching domain, task, and parameter, in accordance with the request received from the user. In an embodiment, the short term memory, the long term memory, or the semantic database may include user generated reviews, recommendations or suggestions, domains, tasks, and parameters, or the like, such as to provide personalized response to the client in accordance with the request received from the user.

At 1032, the method 1000 may allow the call center agent, in communication with the one or more servers, to identify options available from the third party computer for the user. In an embodiment, the one or more servers may be configured to request from the third party computer for available options that match the user request. In an embodiment, the one or more servers can be configured to identify available service options from the third parties over the Internet. In an embodiment, the agent in communication with the one or more servers may analyze the query and decide how to present the response data to the user. In an example, if the request from the user includes a word that can refer to multiple things, like "pi", which is a well-known mathematical constant but, is also the name of a movie. Similarly, other examples can be the meaning of a unit abbreviation like "m", which could be meters or minutes. In an embodiment, the agent in communication with the one or more servers may be identify all possible response options for such ambiguous words as described above, in accordance with the triples retrieved/stored from/on the triple store database.

At 1034, the method 1000 may allow the call center agent, in communication with the one or more servers, to request from the third parties for available options that may match the user request. In an embodiment, the one or more servers can be configured to request the third parties for available service options over the Internet, such as the service option available for travel destinations, hotels, restaurants, bars, pubs, entertainment sites, landmarks, summer camps, resorts, movies, theatres, venues, to-do items, list items, or any other service in accordance with the user request.

In an embodiment, at 1036, the method 1000 may allow the call center agent, in communication with the computing device, to present available options to the user for confirmation. In an embodiment, the call center agent, in communication with the one or more servers, may be configured to receive the available options from the third parties, in accordance with the request for the user. In an embodiment, the method 1000 may allow the computing device to present available time or location options to the user for confirmation. In an embodiment, the call center agent, in communication with the one or more servers, may receive the available time or location options from the third parties, in accordance with the user request.

At 1038, the method 1000 may allow the call center agent, in communication with the one or more servers, to receive confirmation from the user. The call center agent, in communication with the one or more servers, may be configured to automatically make reservation for the available option on behalf of the user, in accordance with the information received from the user such as shown at 1040.

At 1042, the method 1000 may allow the call center agent, in communication with the one or more servers, to generate responsive data from the semantic database in second language. At 1044, the method 1000 may include translating the response data generated in second language into the first language. In an embodiment, the call center agent, in communication with the one or more servers, may output the uniform representation of response and formats the response according to the device and modality that is appropriate and applicable. In an embodiment, the method 1000 may allow the call center agent, in communication with the computing device, to output or render the translated response in the first language to the user, in accordance with the voice request spoken in first language received from the user such as shown at 1046.

The flowcharts described herein may include various steps summarized in individual block or act. The steps may be performed automatically or manually by the user, the computing device, the one or more servers, the databases, or the like. The flowcharts may provide a basis for a control program which may be readily apparent or implemented by a person skilled in art by using the flowcharts and other description described in this document.

The methods or system described herein may be deployed in part or in whole through a machine that executes software programs on a server, client, or other such computer and/or networking hardware on a processor. The processor may be part of a server, client, network infrastructure, mobile computing platform, stationary computing platform, or other computing platform. The processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon.

The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client.

The server may provide an interface to other devices including, without limitation, clients, other servers, printers, database servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention.

The methods described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon and all such implementations may be within the scope of the present disclosure. Furthermore, the elements depicted in the flow chart and block diagrams or any other logical component may be implemented on a machine capable of executing program instructions. Thus, while the foregoing drawings and descriptions set forth functional aspects of the disclosed methods, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

The foregoing descriptions of specific embodiments of the present invention may be presented for the purposes of illustration and description. They may not intend to be exhaustive or to limit the invention to the precise forms disclosed. Obviously, many modifications and variations are possible in view of the above teachings. The embodiments were chosen and described to best explain the basic steps of the invention and its practical applications, thereby enabling others skilled in the art to best utilize the invention and various embodiments with various modifications as may be suited to the particular use. Furthermore, the order of steps, tasks or operations in the method may not necessarily be intended to occur in the sequence laid out. It is intended that the scope of the invention is defined by the following claims and their equivalents.

What is claimed is:

1. A method for providing automated assistance for a user using a computing device selected from a group consisting of: a telephone; a wireless communicator; a tablet computer; a laptop computer; a personal digital assistant; a desktop computer; a processor with memory; a kiosk; a consumer electronic device; a consumer entertainment device; a music player; a camera; a television; an electronic gaming unit; and a set-top box, the method comprising:
receiving a user request for assistance spoken in a first language;
translating the user request spoken in the first language to a second language;
determining semantics of the user request and identifying at least one domain, at least one task, and at least one parameter for the user request;
searching a semantic database on the Internet for the at least one matching domain, task, and parameter;
compensating for translation errors based on user history;

generating a response in the second language; and translating the response to the first language and rendering the response to the user and providing information from one of: music, audiobooks, news, weather, traffic, sports, and processing the user request by an assistant software on a computing cloud to purchase, reserve, or order products or services, wherein the assistant software automatically accesses semantic data and services having one or more triples including subject, predicate, and object available over the Internet to find one or more of: movies, events, performances, exhibits, shows, attractions, travel destinations, hotels, restaurants, bars, pubs, entertainment sites, landmarks, summer camps, resorts, places.

2. The method of claim 1, comprising searching for the at least one matching domain, task and parameter in one of: a semantic hotel database, a semantic restaurant database, a semantic local event database, semantic concert database, a semantic media database, a semantic book database, a semantic music database, a semantic travel database, and a semantic flight database.

3. The method of claim 1, wherein the assistant software is configured based on data-driven triggers, including one of time alarms, calendar alerts, price change triggers, location triggers, push notification from cloud-based servers, and wherein time information is detected from a context of user requests to interpret phrases including one of "in an hour", "today", and "tomorrow" and applied to location of theatres, show timings, available seats make a reservation.

4. The method of claim 1, comprising forwarding the request to a call center agent for handling.

5. The method of claim 1, wherein the receiving the user request comprises recognizing user voice.

6. The method of claim 1, wherein the second language comprises English, French or Chinese.

7. The method of claim 1, wherein the semantic database comprises user generated reviews or recommendations.

8. The method of claim 1, comprising identifying options available from a third party computer for the user and requesting from the third party computer available options that match the user request.

9. The method of claim 8, comprising presenting available options to the user to confirm.

10. The method of claim 8, comprising presenting available time or location options to the user to confirm.

11. The method of claim 8, comprising automatically making a reservation for an available option on behalf of the user.

12. The method of claim 1, comprising eliciting more information on the user request and restating the user request as a confirmation to the user.

13. The method of claim 1, comprising disambiguating alternative parsing by identifying at least two competing semantic interpretations of the user request; and receiving clarification from the user to resolve ambiguity.

14. The method of claim 1, comprising processing the user input using at least one selected from the group consisting of: data from a short term memory describing at least one previous interaction in a current session; and data from a long term memory describing at least one characteristic of the user.

15. The method of claim 1, wherein the semantic database comprises a triple store database.

16. The method of claim 1, comprising managing emails by filtering important emails and responding to the rest on the user's behalf, wherein a user provides guidance on how to pick out key emails and a virtual assistant copies the user before sending out any responses to reduce the risk of errors.

17. The method of claim 1, comprising performing social chores for the user including writing notes on behalf of the user.

18. The method of claim 1, comprising performing travel research including finding hotels, booking airfares and mapping out trip itineraries.

19. The method of claim 1, comprising managing a calendar for the user, dealing with meeting invitations from others, scheduling appointments with clients and helping to plan events.

20. A method for providing automated assistance for a user using a computing device selected from the group consisting of: a telephone; a wireless communicator; a tablet computer; a laptop computer; a personal digital assistant; a desktop computer; a processor with memory; a kiosk; a consumer electronic device; a consumer entertainment device; a music player; a camera; a television; an electronic gaming unit; and a set-top box, the method comprising:

receiving a user request for assistance;

determining semantics of the user request and identifying at least one domain, at least one task, and at least one parameter for the user request;

searching a semantic database on the Internet for the at least one matching domain, task, and parameter; and responding to the user request by:

receiving user voice with the user request spoken in a first language;

translating the user request spoken in the first language to the second language;

compensating for translation errors based on user history;

searching for responsive data in the second language;

translating the response to the first language and rendering the response to the user and providing information from one of music, audiobooks, news, weather, traffic, sports, and processing the user request by an assistant software on a computing cloud to purchase, reserve, order products or services, wherein the assistant software automatically accesses semantic data and services having one or more triples including subject, predicate, and object available over the Internet to find one or more of movies, events, performances, exhibits, shows, attractions, travel destinations, hotels, restaurants, bars, pubs, entertainment sites, landmarks, summer camps, resorts, places.

* * * * *